US012089029B2

(12) United States Patent
Maruyama et al.

(10) Patent No.: US 12,089,029 B2
(45) Date of Patent: Sep. 10, 2024

(54) INFORMATION PROCESSING APPARATUS, CONTROL METHOD, AND NON-TRANSITORY COMPUTER READABLE MEDIUM

(71) Applicant: NEC Corporation, Tokyo (JP)

(72) Inventors: Toshikazu Maruyama, Tokyo (JP); Shizuko Kanegae, Tokyo (JP); Izumi Endo, Tokyo (JP); Kazunari Someya, Tokyo (JP); Goh Shibata, Tokyo (JP); Kiyoshi Morisaki, Tokyo (JP)

(73) Assignee: NEC CORPORATION, Tokyo (JP)

( * ) Notice: Subject to any disclaimer, the term of this patent is extended or adjusted under 35 U.S.C. 154(b) by 156 days.

(21) Appl. No.: 17/782,911

(22) PCT Filed: Dec. 11, 2020

(86) PCT No.: PCT/JP2020/046283
§ 371 (c)(1),
(2) Date: Jun. 6, 2022

(87) PCT Pub. No.: WO2021/125081
PCT Pub. Date: Jun. 24, 2021

(65) Prior Publication Data

US 2023/0007428 A1 Jan. 5, 2023

(30) Foreign Application Priority Data

Dec. 19, 2019 (JP) ................................ 2019-229636

(51) Int. Cl.
*H04S 7/00* (2006.01)
*H04S 3/00* (2006.01)

(52) U.S. Cl.
CPC ............. *H04S 7/303* (2013.01); *H04S 3/008* (2013.01)

(58) Field of Classification Search
CPC .......... H04S 7/303; H04S 7/304; H04S 3/008; H04R 2203/12; H04R 2430/20; G10K 11/34
(Continued)

(56) References Cited

U.S. PATENT DOCUMENTS

2014/0058662 A1* 2/2014 Tachibana ........... H04R 1/1091 701/428
2018/0341982 A1 11/2018 Gotoh
2020/0221245 A1* 7/2020 Mochizuki ............ H04R 1/403

FOREIGN PATENT DOCUMENTS

JP 2017-103598 A 6/2017
JP 2018-097437 A 6/2018
WO 2019/026597 A1 2/2019

OTHER PUBLICATIONS

International Search Report for PCT Application No. PCT/JP2020/046283, mailed on Mar. 9, 2021.
(Continued)

*Primary Examiner* — William A Jerez Lora
(74) *Attorney, Agent, or Firm* — Sughrue Mion, PLLC

(57) ABSTRACT

An information processing apparatus, a control method, and a control program capable of providing an experience close to one experienced in a real space to a user are provided. An information processing apparatus includes: an acquisition unit configured to acquire terminal position information of a communication terminal; a holding unit configured to hold a predetermined area and acoustic-image localization position information of an audio content to be output to the communication terminal while associating them with each other; a generation unit configured to generate acoustic-image localization information based on the acoustic-image localization position information and the terminal position information when the terminal position information is included in the predetermined area; and an output unit
(Continued)

configured to output the acoustic-image localization information.

17 Claims, 13 Drawing Sheets

(58) Field of Classification Search
USPC ................................ 381/124, 303, 308, 310
See application file for complete search history.

(56) References Cited

OTHER PUBLICATIONS

English translation of Written opinion for PCT Application No. PCT/JP2020/046283, mailed on Mar. 9, 2021.
NEC Corp., "NEC begins to provide a space production platform using original acoustic localization technology", NEC Press Releases, Nov. 21, 2019, https://jpn.nec.com/press/201911/20191121_01.html.

* cited by examiner

Fig. 5

Sound Image Localization Relation Table T1

| Target Area | Area Information | Object Information | Audio Content Information | Original Position | Change Information |
|---|---|---|---|---|---|
| Area 1 | Information 1 | Shop Sh | Shop Content 1 | – | Front Right 500cm |
| Area 2 | Information 2 | Character C | Character Content 2 | Front Right 60cm | Front Right 200cm |
| Area 3 | Information 3 | Character C | Character Content 2 | Front Right 60cm | Reduced by 10cm |
| Area 4 | Information 4 | Character C | Generated Content 4 | Front Right 60cm | Right 30cm |
| Area 5 | Information 5 | Character C | Character Content 5 | Front Right 60cm | Height +10cm |
| Area 6 | Information 6 | Guide | Guide Content 1 | – | Front Left 100cm |
| Area 7 | Information 7 | Ninja | Ninja Content 1 | – | Rear 30cm |
| ⋮ | ⋮ | ⋮ | ⋮ | ⋮ | ⋮ |

Fig. 11

Sound Image Localization Relation Table T2

| Target Area | Area Information | Object Information | Audio Content Information | Original Position | Change Information | Video AR Information |
|---|---|---|---|---|---|---|
| Area 1 | Information 1 | Shop Sh | Shop Content 1 | - | Front Right 500cm | Shop Information 1 |
| Area 2 | Information 2 | Character C | Character Content 2 | Front Right 60cm | Front Right 200cm | Character Information 2 |
| Area 3 | Information 3 | Character C | Character Content 2 | Front Right 60cm | Reduced by 10cm | Character Information 3 |
| Area 4 | Information 4 | Character C | Generated Content 4 | Front Right 60cm | Right 30cm | Character Information 4 |
| Area 5 | Information 5 | Character C | Character Content 5 | Front Right 60cm | Height +10cm | Character Information 5 |
| Area 6 | Information 6 | Guide | Guide Content 1 | - | Front Left 100cm | Guide Information 1 |
| Area 7 | Information 7 | Ninja | Ninja Content 1 | - | Rear 30cm | Ninja Information 1 |
| ... | ... | ... | ... | ... | ... | ... |

1, 40, 50, 60, 70, 80, 90, 110, 120

INFORMATION PROCESSING APPARATUS, CONTROL METHOD, AND NON-TRANSITORY COMPUTER READABLE MEDIUM

This application is a National Stage Entry of PCT/JP2020/046283 filed on Dec. 11, 2020, which claims priority from Japanese Patent Application 2019-229636 filed on Dec. 19, 2019, the contents of all of which are incorporated herein by reference, in their entirety.

TECHNICAL FIELD

The present disclosure relates to an information processing apparatus, a control method, and a control program.

BACKGROUND ART

A technology for generating, in order to provide a sound emitted from a personified object to a user, a sound of which the acoustic image is localized at the personified object has been known. Patent Literature 1 discloses a technology in which audio data of a personified object displayed in augmented reality (AR: Augmented Reality) is output from a speaker with a volume that is determined according to the position of this displayed personified object based on sensor data acquired by a wearable information display apparatus.

CITATION LIST

Patent Literature

Patent Literature 1: Japanese Unexamined Patent Application Publication No. 2018-097437

SUMMARY OF INVENTION

Technical Problem

In the technology disclosed in Patent Literature 1, the audio data of the object is processed based on sensor data related to the line of sight of a user, and the direction of the movement and the motion of the user. In other words, in the related art disclosed in Patent Literature 1, the audio data is processed based solely on information about the user under the precondition that the position of the object at which the acoustic image is localized is fixed.

As information services have become diversified and sophisticated in recent years, new experience services that cannot be experienced in a real space have been studied. For example, a service in which a user is virtually accompanied by a personified object has been studied. The technology disclosed in Patent Literature 1 is based on the precondition that the object at which the acoustic image is localized does not move. Therefore, when the technology disclosed in Patent Literature 1 is used, it is impossible to provide a service in which a user can have an experience equivalent to one experienced in a real space. That is, when the technology disclosed in Patent Literature 1 is used, it may not possible to provide an experience close to one experienced in a real space.

In view of the above-described problem, an object of the present disclosure is to provide an information processing apparatus, a control method, and a control program capable of providing an experience close to one experienced in a real space to a user.

Solution to Problem

An information processing apparatus according to the present disclosure includes:

an acquisition unit configured to acquire terminal position information of a communication terminal;

a holding unit configured to hold a predetermined area and acoustic-image localization position information of an audio content to be output to the communication terminal while associating them with each other;

a generation unit configured to generate acoustic-image localization information based on the acoustic-image localization position information and the terminal position information when the terminal position information is included in the predetermined area; and an output unit configured to output the acoustic-image localization information.

A control method according to the present disclosure includes:

acquiring terminal position information of a communication terminal;

holding a predetermined area and acoustic-image localization position information of an audio content to be output to the communication terminal while associating them with each other;

generating acoustic-image localization information based on the acoustic-image localization position information and the terminal position information when the terminal position information is included in the predetermined area; and outputting the acoustic-image localization information.

A control program according to the present disclosure is a control program for causing a computer to perform:

acquiring terminal position information of a communication terminal;

holding a predetermined area and acoustic-image localization position information of an audio content to be output to the communication terminal while associating them with each other;

generating acoustic-image localization information based on the acoustic-image localization position information and the terminal position information when the terminal position information is included in the predetermined area; and outputting the acoustic-image localization information.

Advantageous Effects of Invention

According to the present disclosure, it is possible to provide an information processing apparatus, a control method, and a control program capable of providing an experience close to one experienced in a real space to a user.

BRIEF DESCRIPTION OF DRAWINGS

FIG. 5 shows an example of an acoustic-image localization relation table;

FIG. 11 shows an example of an acoustic-image localization relation table according to the fifth example embodiment;

EXAMPLE EMBODIMENT

Figure 1:
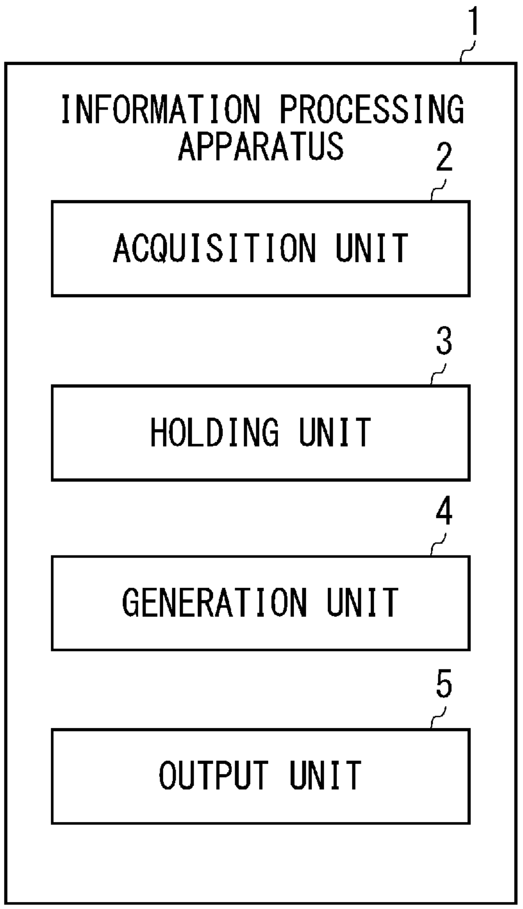
FIG. 1 shows an example of a configuration of an information processing apparatus according to a first example embodiment.

An example embodiment will be described hereinafter with reference to the drawings. Note that, in the example embodiment, the same elements are denoted by the same reference numerals (or symbols), and redundant descriptions thereof are omitted.

First Example Embodiment

An example of a configuration of an information processing apparatus 1 according to a first example embodiment will be described with reference to FIG. 1. FIG. 1 shows an example of the configuration of the information processing apparatus according to the first example embodiment. The information processing apparatus 1 includes an acquisition unit 2, a holding unit 3, a generation unit 4, and an output unit 5.

The acquisition unit 2 acquires terminal position information of a communication terminal (not shown) from the communication terminal.

The holding unit 3 holds a predetermined area and acoustic-image localization position information of an audio content to be output to the communication terminal while associating them with each other (i.e., in a state in which they are associated with each other).

The holding unit 3 may hold, in advance, a table in which pieces of position information for specifying predetermined areas, audio contents to be output to communication terminals, and pieces of acoustic-image localization position information of the audio contents are associated with each other. Alternatively, the holding unit 3 may acquire the above-described table from other communication apparatuses and hold the acquired table. The predetermined area may be a predefined area called a geofence.

The audio content may be an audio content related to a virtual object, or may be, when a voice recognition service is used, an audio content corresponding to a result of voice recognition. The audio content may be an audio content for which an acoustic-image localizing process has not been performed yet, and may be an audio content stored in advance in the information processing apparatus 1. In other words, the audio content may be an audio content to which a parameter(s) for performing an acoustic-image localizing process has not been added yet.

The virtual object may be, for example, a virtual character such as a virtual friend, a virtual boyfriend/girlfriend, or a virtual guide, or may be a character in an animated cartoon or an actor/actress who appears in a TV drama or the like. Alternatively, the virtual object may be a virtual object such as a shop, a signboard, or a pair of sandals.

The acoustic-image localization position information is position information related to a relative position with respect to the terminal position information (i.e., with respect to the position of the terminal indicted by the terminal position information). Therefore, in the following description, the fact that the acoustic-image localization position information or the acoustic image localized position is changed or adjusted means that the relative position of the acoustic-image localization position information or the acoustic image localized position with respect to the terminal position information of the communication terminal is changed.

When the terminal position information is included in the predetermined area, the generation unit 4 generates acoustic-image localization information based on the acoustic-image localization position information, the terminal position information, and the like. The acoustic-image localization information is a parameter used to perform an acoustic-image localizing process for the audio content associated with the predetermined area. In other words, the acoustic-image localization information is a parameter used to correct the audio content associated with the predetermined area so that a user can hear the audio content as a sound emitted from the acoustic-image localization position. Therefore, the acoustic-image localization information may include the terminal position information, and also include the position information of an object, i.e., the position information of a target object, the terminal position information and the acoustic-image localization position information, and a relative angle between the terminal position information and the position information of the object. Further, the acoustic-image localization information may be generated, or may be performing a process for changing the acoustic-image localization position for predetermined acoustic-image localization information.

The output unit 5 outputs the acoustic-image localization information. The output unit 5 outputs the acoustic-image localization information to at least one of a control unit (not shown) provided in the information processing apparatus 1 and a communication terminal. When the output unit 5 outputs the acoustic-image localization information to the control unit, the control unit may correct the audio content associated with the predetermined area based on the acoustic-image localization information, and output the corrected audio content toward the left and right ears of the user who possesses the communication terminal. Alternatively, when the output unit 5 outputs the acoustic-image localization information to the communication terminal, the output unit 5 may transmit the audio content associated with the predetermined area and the acoustic-image localization information to the communication terminal. Then, the output unit 5 may transmit, to the communication terminal, control information by which the communication terminal corrects the audio content based on the acoustic-image localization information and outputs the corrected audio content toward the left and right ears of the user who possesses the communication terminal. Further, when the communication terminal holds the audio content in advance, the output unit 5 may output only the acoustic-image localization information.

Figure 2:
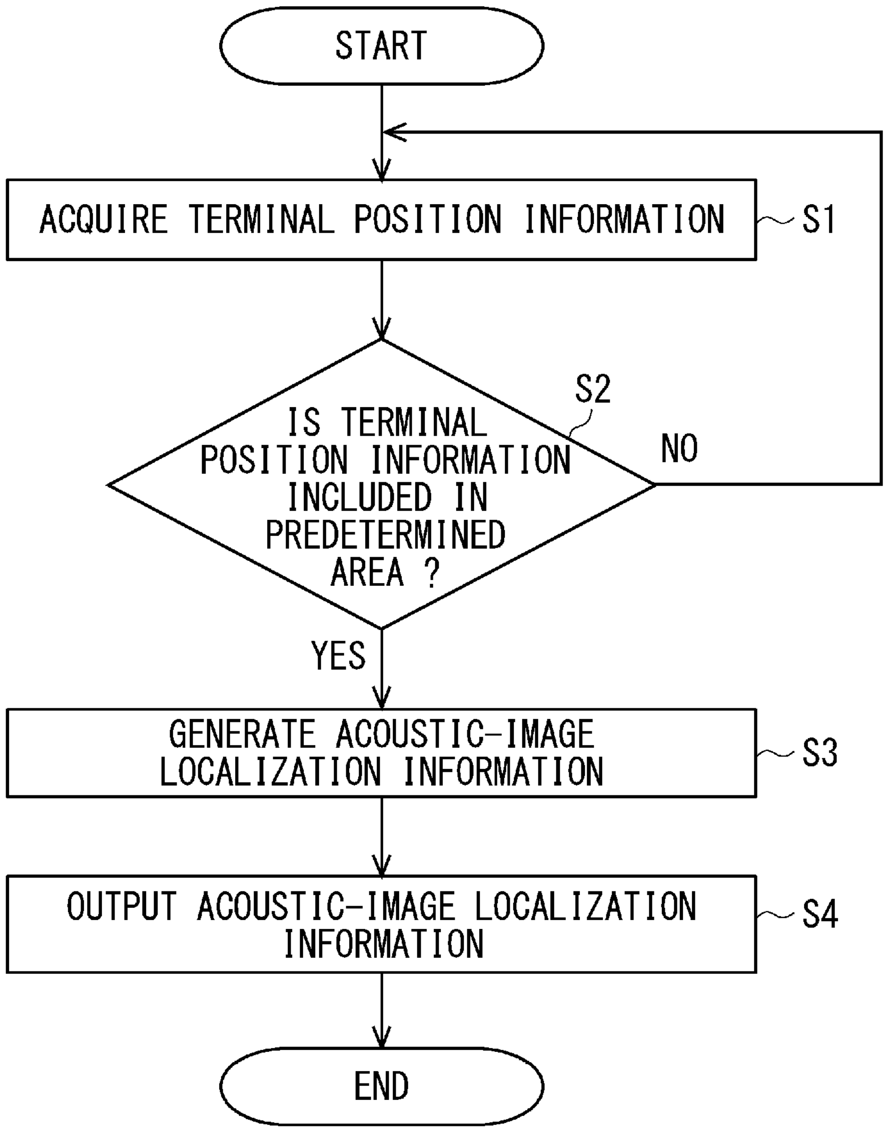
FIG. 2 is a flowchart showing an example of operations performed by the information processing apparatus according to the first example embodiment.

Next, an example of operations performed by the information processing apparatus 1 according to the first example embodiment will be described with reference to FIG. 2. FIG. 2 is a flowchart showing an example of operations performed by the information processing apparatus according to the first example embodiment. Note that the following description will be given on the precondition that the holding unit 3 holds a table in which pieces of position information for specifying predetermined areas, audio contents to be output to communication terminals, and pieces of acoustic-image localization position information of the audio contents are associated with each other. Further, the information processing apparatus 1 performs the example of operations shown in FIG. 2 every time the information processing apparatus 1 acquires terminal position information.

The acquisition unit 2 acquires the terminal position information from a communication terminal (not shown) (Step S1).

The generation unit 4 determines whether or not the terminal position information (i.e., the position of the terminal indicted by the terminal position information) is included in the predetermined area (Step S2). The generation unit 4 compares the terminal position information with position information specifying a predetermined area listed in the table, and determines whether or not the terminal position information is included in the predetermined area.

Note that the generation unit 4 may calculate an approach angle of the communication terminal to the predetermined area based on the terminal position information, and determine whether or not the terminal position information is included in the predetermined area by further using the approach angle. Specifically, the acquisition unit 2 and the generation unit 4 successively acquire the terminal position information of the communication terminal. The generation unit 4 calculates a moving path of the communication terminal based on a group of pieces of terminal position information composed of a plurality of acquired pieces of terminal position information. The generation unit 4 determines at what angle the communication terminal has entered the predetermined area based on the calculated moving path. The generation unit 4 calculates an approach angle with respect to the center of the predetermined area from the moving path, and determines whether or not the approach angle is included in a predetermined range of angles. The generation unit 4 may determine that the terminal position information is included in the predetermined area when the terminal position information is included in the predetermined area and the approach angle is within the predetermined range of angles.

When the terminal position information is included in the predetermined area (Yes in Step S2), the generation unit 4 generates acoustic-image localization information based on the acoustic-image localization position information associated with the predetermined area and the terminal position information (Step S3).

On the other hand, when the terminal position information is not included in the predetermined area (No in Step S2), the process returns to the step S1 and the information processing apparatus 1 performs the operation in the step S1.

The output unit 5 outputs the acoustic-image localization information to at least one of the control unit provided in the information processing apparatus 1 and the communication terminal (Step S4).

As described above, when the terminal position information is included in the predetermined area, the information processing apparatus 1 generates acoustic-image localization information based on the acoustic-image localization position information associated with the predetermined area and the terminal position information. The information processing apparatus 1 outputs the generated acoustic-image localization information to at least one of the control unit of the information processing apparatus itself and the communication terminal. The control unit of the information processing apparatus itself and the communication terminal correct the audio content to be output for the user based on the acoustic-image localization information, so that they can output the corrected audio content for the user. That is, according to the information processing apparatus 1 in accordance with the first example embodiment, it is possible to generate acoustic-image localization information that makes it possible to make the user hear such a sound that the user perceives it as if a virtual object is moving, and thereby to provide an experience close to one experienced in a real space to the user.

Second Example Embodiment

Next, a second example embodiment will be described. The second example embodiment is a specific example of the first example embodiment. Firstly, prior to describing a specific example of a configuration according to the second example embodiment, an outline of the second example embodiment will be described.

<Overview>

In recent years, services using AR technologies have been studied. As a service using an AR technology, for example, a service in which a user feels as if he/she is accompanied by a virtual character, such as a character in an animated cartoon or an actor/actress in a TV drama or the like, has been studied. In such a service, a situation in which the aforementioned character speaks to a user from a virtual position where the virtual character is present so that the user can feel that he/she is virtually accompanied by the virtual character has also been studied. Since the aforementioned character is a virtual character, the service may be referred to as an AR service in which the real world is augmented, and may also be referred to as an acoustic AR service. Note that the virtual character may be a virtual object such as a shop, a signboard, or a pair of sandals.

The second example embodiment relates to an information processing system for realizing the aforementioned so-called acoustic AR service. Note that, as described above, since the information processing system is a system for realizing an acoustic AR service, it may also be referred to as an acoustic AR system.

Figure 3:
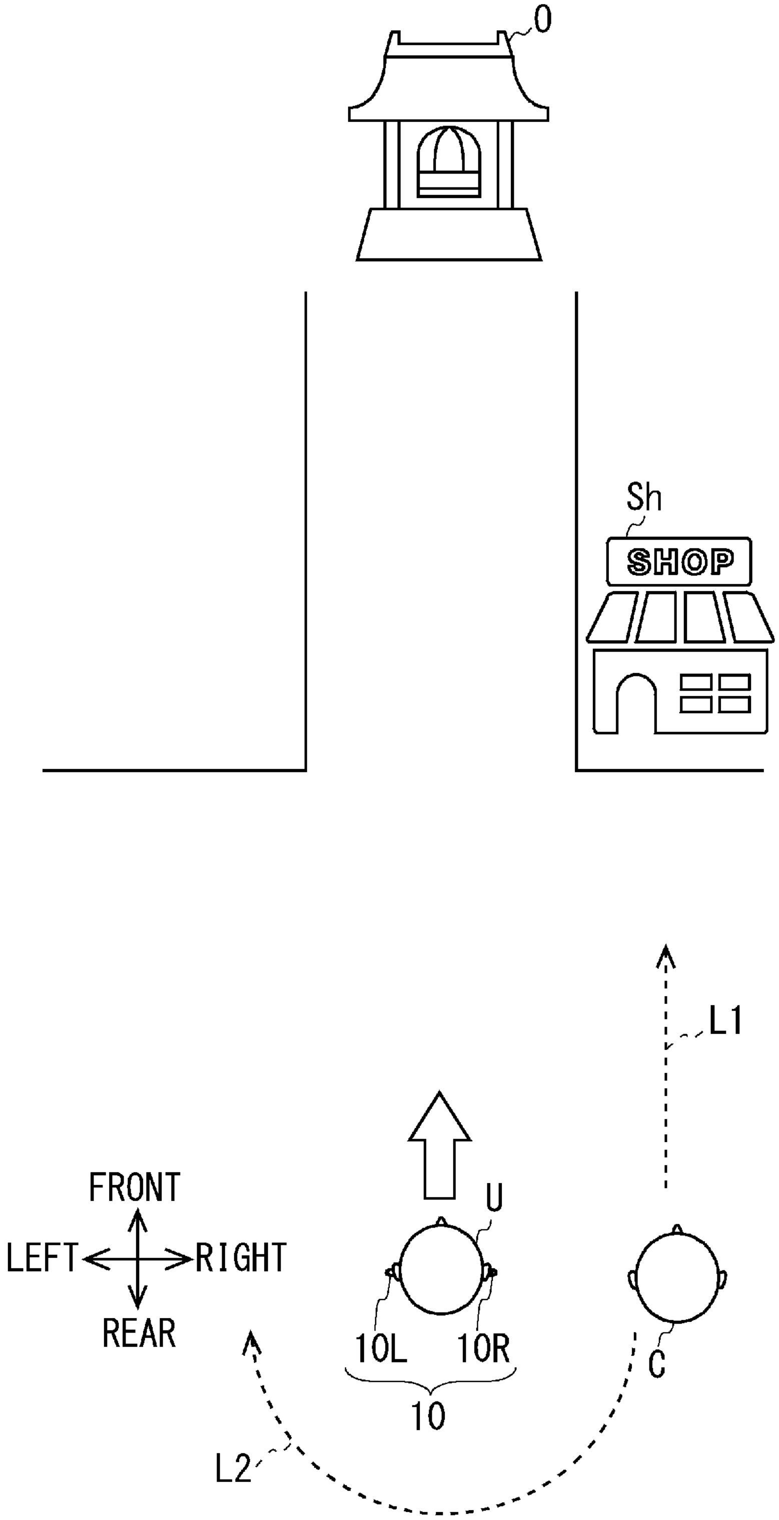
FIG. 3 is a diagram for explaining an outline of an information processing system according to a second example embodiment.

An outline of the information system according to the second example embodiment will be described hereinafter with reference to FIG. 3. FIG. 3 is a diagram for explaining an outline of the information processing system according to the second example embodiment. The information processing system according to the second example embodiment will be described on the assumption that it is, for example, a system that provides an acoustic AR service in which a user feels as if he/she is virtually accompanied by a virtual character such as a virtual friend or a virtual boyfriend/girlfriend.

FIG. 3 is a schematic diagram schematically showing an area where a user U is present as viewed from above in the vertically downward direction, and schematically showing a state in which, for example, the user U, who is accompanied by a virtual character C, is moving (e.g., walking) toward a building O in a sightseeing spot. In the information processing system according to the second example embodiment, a communication terminal 40, which is carried (e.g., worn) by the user U, outputs an audio content for the user U in such a manner that the user U feels as if the character C present near him/her speaks to him/her at an arbitrary timing.

Note that, in FIG. 3, the building O is an example of the target object toward which the user U moves, and the target object may be, for example, a facility or a shop, or may be any of various types of objects, such as a sign, a signboard, a mannequin, a mascot doll, an animal, and a firework. Further, although the character C does not actually exist in the real space, it is shown in the drawing for the sake of explanation. In FIG. 3, solid arrows indicate the front, rear, left and right directions of the user U. The virtual position of the character C is set as a relative position with respect to the position of the user U, and in the example shown in FIG. 3, the virtual position of the character C is a position located on the right side of the user U. Note that the virtual position of the character C can be set at an arbitral position.

Here, it is assumed that the information processing system according to the second example embodiment provides an acoustic AR service in which the character C is always present on the right side of the user U as shown in FIG. 3. In the real world, for example, a friend or a boyfriend/girlfriend moves toward a shop Sh he/she has an interest at an arbitrary timing, or moves around the user U at an arbitrary timing. Therefore, if the information processing system according to the second example embodiment provides an acoustic AR service in which the character C is always present on the right side of the user U, it cannot provide an experience close to one experienced in a real space to the user. Therefore, the information processing system according to the second example embodiment provides an audio content to a user U in such a manner that the user U feels as if the character C moves close to the shop Sh as indicated by a dotted line L1 or moves from the right side of the user U to the left side thereof as indicated by a dotted line L2.

Further, the information processing system according to the second example embodiment provides an experience close to one experienced in a real space or an experience that cannot be experienced in a real space to the user U, so that it realizes such a situation that, for example, when the user U moves close to the shop Sh, the shop Sh virtually speaks to the user U.

Note that, in the present disclosure, the communication terminal 40 is described as a communication terminal including a left unit 40L attached to the left ear of the user U and a right unit 40R attached to the right ear thereof. Further, the audio content output for the user U is described as audio contents including a left-ear audio content corresponding to the left unit 40L and a right-ear audio content corresponding to the right unit 40R.

<Example of Configuration of Information Processing System>

Figure 4:
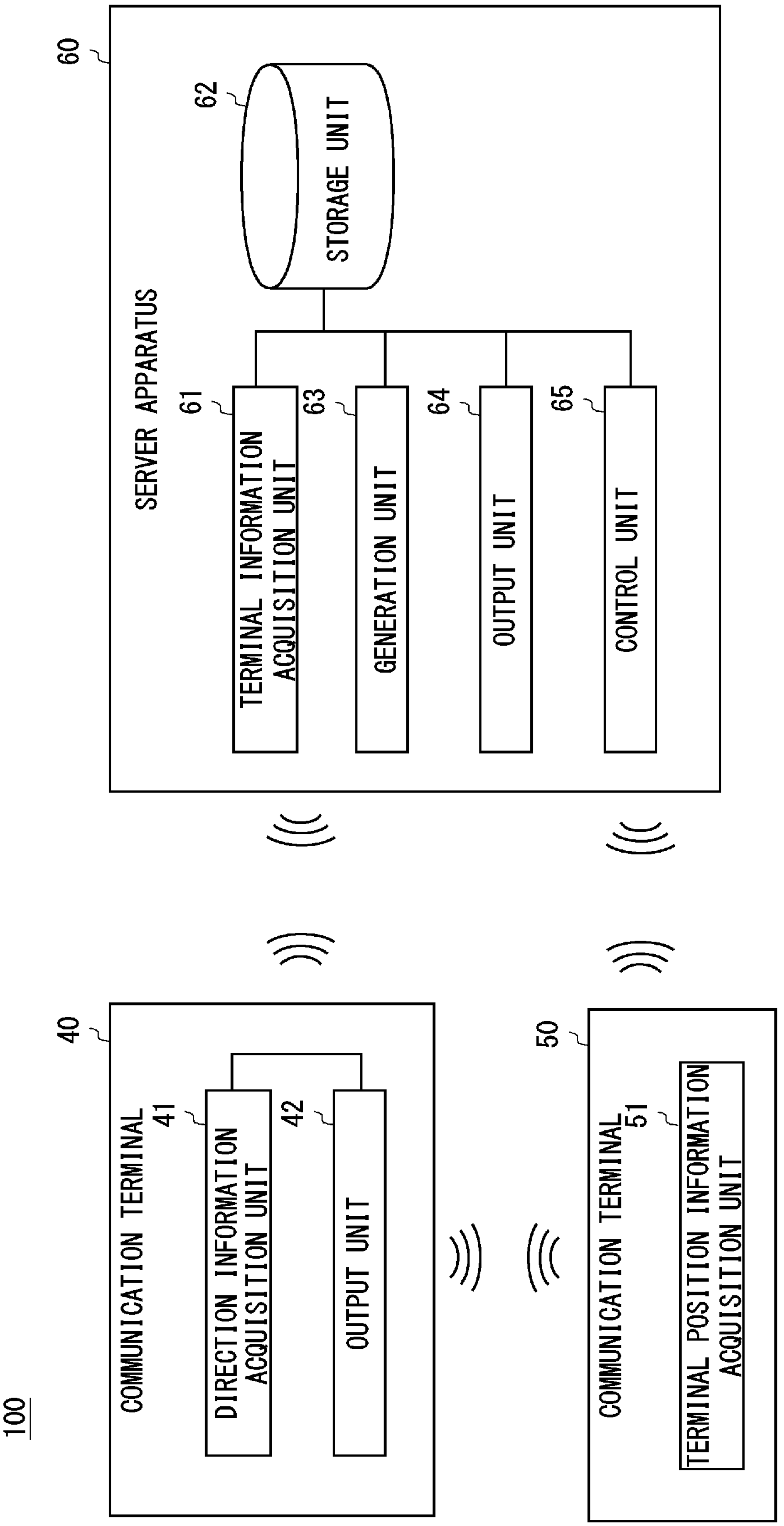
FIG. 4 shows an example of a configuration of the information processing system according to the second example embodiment.

Next, an example of a configuration of an information processing system 100 will be described with reference to FIG. 4. FIG. 4 shows an example of the configuration of the information processing system according to the second example embodiment. The information processing system 100 includes communication terminals 40 and 50, and a server apparatus 60.

The communication terminal 40, which is the communication terminal 40 shown in FIG. 3, is possessed by the user U and attached to (e.g., worn by) the user U. As described above, the communication terminal 40 is a communication terminal attached to each of both ears of the user, and includes a left unit 40L attached to the left ear of the user and a right unit 40R attached to the right ear thereof. Since the communication terminal 40 is composed of devices attached to both ears of the user, it may also be referred to as a hearable device(s). Note that the communication terminal 40 may be a communication terminal in which a left unit 40L and a right unit 40R are integrally formed (i.e., formed as one component).

The communication terminal 40 is, for example, a communication terminal capable of performing radio communication provided by a communication carrier, and communicates with the server apparatus 60 through a network provided by a communication carrier. The communication terminal 40 acquires direction information of the communication terminal 40 and transmits the acquired direction information to the server apparatus 60. The communication terminal 40 outputs an audio content for which an acoustic-image localizing process has been performed to each of both ears of the user. Note that although the following description will be given on the assumption that the communication terminal 40 (the left and right units 40L and 40R) directly communicates with the server apparatus 60, the communication terminal 40 may be configured so as to communicate with the server apparatus 60 through the communication terminal 50.

The communication terminal 50 may be, for example, a smartphone terminal, a tablet-type terminal, a cellular phone, or a personal computer apparatus. The communication terminal 50 is also a communication terminal possessed by the user U shown in FIG. 3. The communication terminal 50 connects to and communicates with the communication terminal 40 through radio communication such as Bluetooth (Registered Trademark) or WiFi. Further, the communication terminal 50 communicates with the server apparatus 60 through, for example, a network provided by a communication carrier. The communication terminal 50 acquires terminal position information of the communication terminal 40 (the left and right units 40L and 40R) and transmits the acquired terminal position information to the server apparatus 60. Note that, in the present disclosure, although it is assumed that the communication terminal 50 acquires the terminal position information of the communication terminal 40 (the left and right units 40L and 40R), the position information of the communication terminal 50 may be used as the terminal position information of the left and right units 40L and 40R.

Note that although the information processing system 100 includes two communication terminals (the communication terminals 40 and 50) in FIG. 4, the communication terminals 40 and 50 may be constructed, for example, as one communication terminal such as a head-mounted display. Further, the communication terminal 40 may acquire not only the direction information of the communication terminal 40 but also the terminal position information thereof. That is, it is sufficient if the information processing system 100 includes at least one communication terminal.

The server apparatus 60 corresponds to the information processing apparatus 1 in the first example embodiment. The server apparatus 60 communicates with the communication terminals 40 and 50 through, for example, a network provided by a communication carrier. The server apparatus 60 acquires the direction information and the terminal position information of the communication terminal 40 from each of the communication terminals 40 and 50.

When the terminal position information is included in the predetermined area, the server apparatus 60 changes the acoustic-image localization position of the character C or the like shown in FIG. 3. The server apparatus 60 outputs an audio content that has been corrected based on acoustic-image localization information corresponding to the changed acoustic-image localization position for the user.

<Example of Configuration of Communication Terminal>

Next, an example of a configuration of the communication terminal 40 will be described. The communication terminal 40 includes a direction information acquisition unit 41 and an output unit 42. Note that since the communication terminal 40 includes the left and right units 40L and 40R, each of the left and right units 40L and 40R may include a direction information acquisition unit 41 and an output unit 42.

The direction information acquisition unit 41 includes, for example, a 9-axis sensor (a 3-axis acceleration sensor, a 3-axis gyroscopic sensor, and a 3-axis compass sensor). The direction information acquisition unit 41 acquires direction information of the communication terminal 40 by using the 9-axis sensor. The direction information acquisition unit 41 acquires the direction information in a periodic manner or in a non-periodic manner.

The direction information acquisition unit 41 acquires, as the direction information, direction information including the orientation of the communication terminal 40 (i.e., the direction in which the communication terminal 40 faces) and the moving direction of the communication terminal 40, both of which are acquired by the 9-axis sensor. The direction information acquisition unit 41 transmits the acquired direction information to the communication terminal 50. Note that the direction information acquisition unit 41 may transmit the acquired direction information to the server apparatus 60.

Since the direction information acquisition unit 41 includes the 9-axis sensor, it can acquire not only the orientation and the moving direction of the communication terminal 40 but also the posture of the user. Therefore, the direction information may include the posture of the user, and may also be referred to as posture information. Further, since the direction information is data acquired by the 9-axis sensor, it may also be referred to as sensing data.

The output unit 42 includes, for example, stereo speakers or the like. The output unit 42 also functions as a communication unit, so that it receives an audio content for which an acoustic-image localizing process has already been performed by the server apparatus 60, and outputs the received audio content toward the ears of the user. The audio content for which the acoustic-image localizing process has already been performed by the server apparatus 60 includes a left-ear audio content for the left unit 40L and a right-ear audio content for the right unit 40R. The output unit 42 of the left unit 40L outputs an audio content for the left ear, and the output unit 42 of the right unit 40R outputs an audio content for the right ear.

Next, an example of a configuration of the communication terminal 50 will be described. The communication terminal 50 includes a terminal position information acquisition unit 51.

The terminal position information acquisition unit 51 includes, for example, a GPS (Global Positioning System) receiver, an altitude sensor, and the like. The terminal position information acquisition unit 51 receives GPS signals and acquires latitude and longitude information of the communication terminal 50 based on the GPS signals. The terminal position information acquisition unit 51 acquires altitude information of the communication terminal 50 by the altitude sensor.

The terminal position information acquisition unit 51 acquires terminal position information of each of the left and right units 40L and 40R of the communication terminal 40. As described above, the communication terminal 50 communicates with the left and right units 40L and 40R, for example, through radio communication such as Bluetooth or WiFi. The terminal position information acquisition unit 51 calculates latitude and longitude information and altitude information of each of the left and right units 40L and 40R by using the direction information (the sensing data) acquired by the direction information acquisition unit 41 of each of the left and right units 40L and 40R. The terminal position information acquisition unit 51 acquires the latitude and longitude information and the altitude information of each of the left and right units 40L and 40R as terminal position information. The terminal position information acquisition unit 51 periodically acquires the position of each of the left and right units 40L and 40R. The terminal position information acquisition unit 51 transmits the terminal position information of each of the left and right units 40L and 40R to the server apparatus 60.

Note that the terminal position information acquisition unit 51 acquires the latitude and longitude information and the altitude information of each of the left and right units 40L and 40R based on the signal strength and the arriving direction of a radio signal used for the communication with the left and right units 40L and 40R. Further, the terminal position information acquisition unit 51 may use information including the latitude and longitude information and the altitude information as the terminal position information.

<Example of Configuration of Server Apparatus>

Next, an example of a configuration of the server apparatus 60 will be described. The server apparatus 60 includes a terminal information acquisition unit 61, a storage unit 62, a generation unit 63, an output unit 64, and a control unit 65.

The terminal information acquisition unit 61 corresponds to the acquisition unit 2 in the first example embodiment. The terminal information acquisition unit 61 acquires terminal position information of the communication terminal 40. The terminal information acquisition unit 61 also functions as a communication unit, so that it acquires terminal position information by receiving it from the communication terminal 50. The terminal information acquisition unit 61 outputs the acquired terminal position information to the generation unit 63.

The storage unit 62 corresponds to the holding unit 3 in the first example embodiment. The storage unit 62 stores an acoustic-image localization relation table T1. The storage unit 62 may store the acoustic-image localization relation table T1 in advance, or may receive the acoustic-image localization relation table T1 from other communication apparatus and holds the received table.

An example of the acoustic-image localization relation table T1 will be described hereinafter with reference to FIG. 5. FIG. 5 shows an example of the acoustic-image localization relation table. The acoustic-image localization relation table T1 is a table in which target areas to which the acoustic-image localization position is changed, audio contents that are output when the terminal position information is included in the target area, and pieces of information related to the acoustic image localized position are associated with each other.

As shown in FIG. 5, in the acoustic-image localization relation table T1, starting from the leftmost column, target areas, pieces of area information, pieces of object information, pieces of audio content information, original positions (i.e., positions before the change), and pieces of change information are set (i.e., listed). Further, in the acoustic-image localization relation table T1, for example, labels indicating which item the respective columns represent are set (i.e., defined) in the first row, and details of setting specified by the administrator of the server apparatus 60 or the information processing system 100 are set (i.e., specified) in the second and subsequent rows.

In the target area column, area numbers of target areas to which the acoustic-image localization position is changed are set.

In the area information column, pieces of information about the areas set in the target area column are set. In the area information column, pieces of information for specifying target areas to which the acoustic-image localization position is changed are set, and they can include a latitude, a longitude, a range, and a size.

Further, the area information may include, for example, characteristic information indicating a characteristic of the target area such as “Area where night view is beautiful from 18:00 to 24:00” or “Area which is crowded from 11:00 to 17:00”. For example, the characteristic information may be set in such a manner that a time period is associated with a characteristic of the target area.

Further, the area information may include angle information related to an approach angle when the terminal position information enters the target area. When the area information includes the angle information, the characteristic information may be associated with the angle information. For example, the characteristic information “Area where night view is beautiful from 18:00 to 24:00” is associated with angle information θ1, and the characteristic information “Area which is crowded from 11:00 to 17:00” is associated with angle information θ2. In this way, it is possible to provide no audio service to a user having a communication terminal that enters “Area where night view is beautiful from 18:00 to 24:00” at 15:00 at an approach angle of θ1 or smaller, and to provide an audio content for guiding the night view to a user who enters the area at an approach angle of θ1 or smaller at or after 18:00. Therefore, in this way, it is possible to develop services closer to those provided in a real space.

In the object information column, object names related to audio contents to be output for the user are set. For example, when the terminal position information is included in the Area 1 and an audio content of the shop Sh or the character C shown in FIG. 3 is output, the shop Sh or the character C is set in the object information.

In the audio content information column, pieces of audio content information that are output for the user when the terminal position information is included in the area information are set. In the audio content information column, audio content names that are stored in advance in the storage unit 62 may be set. Alternatively, in the audio content information column, use of audio contents that are generated by processing parts of audio contents stored in the storage unit 62 by the control unit 65 (which will be described later) may be set. Alternatively, in the audio content information column, use of audio contents that are newly generated by the control unit 65 (which will be described later), such as responses to what are spoken by the user, may be set. Note that, in the following description, the audio contents generated by the control unit 65 may also be collectively referred to as generated contents (or contents to be generated).

In the original position column, original acoustic image localized positions (i.e., acoustic image localized positions before the change) for the respective audio contents are set. In the original position column, relative positions with respect to the terminal position information are set. As shown in FIG. 5, in the original position column, directions with respect to the communication terminal 40 and distances from the communication terminal 40 are set. For a virtual object that virtually (i.e., imaginarily) accompanies the user U, such as the character C shown in FIG. 3, the virtual position of the character C is set in the original position. For an object of which the position is fixed, such as the shop Sh shown in FIG. 3, no information may be set in the original position. Further, for a character that is different from the character C shown in FIG. 3 and appears only in a specific area, such as a guide, no information may be set in the original position.

Note that, in FIG. 5, although “Front Right” and “Right” are set as the directions with respect to the communication terminal 40 in the original position column, an angle between the direction indicated by the direction information of the communication terminal 40 and the direction of the acoustic-image localization position with respect to the position of the communication terminal 40 may be set therein. In other words, a combination of an angle between the forward direction of the communication terminal 40 and the direction of the acoustic image localized position with respect to the position of the communication terminal 40 and a distance to the acoustic-image localization position with respect to the position of the communication terminal 40 may be set in the original position. Note that, in practice, the acoustic-image localization position may be determined according to the positions of various real objects, such as in a scene in which a virtual person speaks from the vicinity of various real objects. Therefore, an angle between the direction indicated by the direction information of the communication terminal 40 and the direction of the position of the target object, which is a specific object, with respect to the position of the communication terminal 40 may be set in the original position.

In the change information column, pieces of information for specifying changed acoustic image localized positions are set for the respective audio contents. In the change information column, a relative position of the acoustic-image localization position with respect to the terminal position information may be set. Alternatively, in the change information column, a change distance (i.e., a distance of a change) from the original acoustic image localized position may be set. Alternatively, in the acoustic-image localization position information, height information (i.e., information about the height) by which the acoustic image localized position is changed from the original one may be set.

Although only one change in position or height is set in each cell in the change information column in FIG. 5, a plurality of changes in position and height may be set in a time-series manner in one cell in the change information column. In the change information column, for example, repetitive changes in the height that occur at predetermined interval may be set, or changes representing movements of the character C may be set.

Note that although no information related to changed acoustic-image localization positions is included in the acoustic-image localization relation table T1, the storage unit 62 holds acoustic-image localization position information related to the changed acoustic-image localization position determined by the generation unit 63 (which will be described later) while associating it with other relevant information. Further, in the present disclosure, although the acoustic-image localization relation table T1 is described on the assumption that it holds (i.e., contains) pieces of change information, the acoustic-image localization relation table T1 may hold (contain) changed acoustic-image localization positions in addition to or instead of the pieces of change information.

The description will be continued by referring to FIG. 4 again. The storage unit 62 stores one or a plurality of audio contents set in the audio content column in the acoustic-image localization relation table T1. One or a plurality of audio contents are audio contents for which an acoustic-image localizing process has not been performed yet. That is, the storage unit 62 stores one or a plurality of audio contents to which a parameter(s) for performing an acoustic-image localizing process has not been added yet.

The generation unit 63 corresponds to the generation unit 4 in the first example embodiment. When the terminal position information is included in one of the target areas listed in the acoustic-image localization relation table T1, the generation unit 63 generates acoustic-image localization information based on the acoustic-image localization position information and the terminal position information. The acoustic-image localization position information is information related to the changed acoustic image localized position. The acoustic-image localization information is a parameter that is used to perform an acoustic-image localizing process for the audio content associated with the target area in which the terminal position information is included. The acoustic-image localization information is a parameter for correcting the audio content associated with the target area in which the terminal information is included so that the audio content can be heard as a sound emitted from the changed acoustic-image localization position (the acoustic-image localization position information).

The generation unit 63 compares area information in the acoustic-image localization relation table T1 with the terminal position information, and thereby determines, for each of the target areas in the acoustic-image localization relation table T1, whether or not the terminal position information is included in that target areas.

Note that the generation unit 63 may calculate, for each of the target areas, an approach angle of the communication terminal 40 to that target area based on the terminal position information, and thereby determine whether or not the terminal position information is included in any of the target areas. In such a case, the generation unit 63 calculates the moving path of the communication terminal 40 based on a group of pieces of terminal position information composed of a plurality of acquired pieces of terminal position information. The generation unit 63 calculates, for each of the target areas, an approach angle of the communication terminal 40 to that target area based on the calculated moving path. The generation unit 63 calculates, for each of the target areas, an approach angle of the communication terminal 40 to the center of that target area obtained (e.g., calculated) from the area information of that target area based on the calculated moving path. The generation unit 63 determines, for each of the target areas, whether the approach angle to that target area is within a predetermined range of angles. The generation unit 63 determines a target area of which the terminal position information is included in the area information, and in which the approach angle to the target area corresponding to the area information is within the predetermined range of angles.

When one of the pieces of area information listed in the acoustic-image localization relation table T1 includes the terminal position information, the generation unit 63 acquires the original position, the change information, and the audio content information associated with the area information including the terminal position information in the acoustic-image localization relation table T1. The generation unit 63 outputs the acquired audio content information to the control unit 65.

The generation unit 63 determines changed acoustic-image localization position based on the acquired original position and the change information, and holds the determined changed acoustic-image localized position as acoustic-image localization position information. Note that the generation unit 63 may set the changed acoustic-image localization position by using, in addition to the original position and the change information, which are the terminal position information, position information of an actually-existing object(s) associated with the target area and an approach angle to the target area. The approach angle may preferably be an approach angle or the like of the terminal to the center (the central position) of the target area. Specifically, the generation unit 63 may change, based on the acquired original position and the change information, and the approach angle to the target area, the acoustic-image localization position only when the approach angle of the user to the target area specified by the terminal position information is within a predetermined angle range. On the other hand, when the approach angle to the target area is not within the predetermined angle range, the generation unit 63 may not change the acoustic-image localization position.

The generation unit 63 stores the determined changed acoustic-image localization position in the storage unit 62. When the object information associated with the original position to be updated is related to a plurality of pieces of information (a plurality of records) listed in the acoustic-image localization relation table T1 as in the case of the character C, the generation unit 63 updates the original positions of all the pieces of information (all the records) of which the object information is the character C.

The generation unit 63 generates acoustic-image localization information based on the acoustic-image localization position information and the terminal position information. Note that when a plurality of changes in the position and/or a plurality of changes in the height are set in a time-series manner in the change information set (i.e., recorded) in the acoustic-image localization relation table T1, the generation unit 63 generates a plurality of pieces of acoustic-image localization position information corresponding to respective times and respective acoustic-image localization positions.

As described above, the terminal position information includes the terminal position information of each of the left and right units 40L and 40R. The generation unit 63 generates left-ear acoustic-image localization information for the left unit 40L based on the terminal position information of the left unit 40L and the changed acoustic-image localization position information. The generation unit 63 generates right-ear acoustic-image localization information based on the terminal position information of the right unit 40R and the changed acoustic-image localization position information. The generation unit 63 outputs acoustic-image localization information including the left-ear acoustic-image localization information and the right-ear acoustic-image localization information to the output unit 64.

The output unit 64 corresponds to the output unit 5 in the first example embodiment. The output unit 64 outputs the acoustic-image localization information including the left-ear acoustic-image localization information and the right-ear acoustic-image localization information generated by the generation unit 63 to the control unit 65.

The control unit 65 acquires, from the storage unit 62, an audio content corresponding to the audio content information output from the generation unit 63. When the audio content information output from the generation unit 63 is an audio content to be generated by the control unit 65 (i.e., an audio content that should be generated by the control unit 65) like the Generated Content 4 in FIG. 5, the control unit 65 generates the audio content. For example, when the control unit 65 generates an audio content based on a voice signal of a user, the terminal information acquisition unit 61 receives a voice signal of the user who possesses the communication terminal 40. Then, the control unit 65 performs voice recognition for this voice signal, performs a morphological analysis for information obtained by the voice recognition, and generates an audio content corresponding to the voice signal of the user.

The control unit 65 performs an acoustic-image localizing process for the acquired or generated audio content based on the acoustic-image localization information generated by the generation unit 63. In other words, the control unit 65 corrects the acquired or generated audio content based on the acoustic-image localization information. The control unit 65 generates a left-ear audio content by correcting the audio content based on the left-ear acoustic-image localization information. The control unit 65 generates a right-ear audio content by correcting the audio content based on the right-ear acoustic-image localization information.

The control unit 65 also functions as a communication unit, so that it transmits the left-ear and right-ear audio contents to the left and right units 40L and 40R, respectively, of the communication terminal 40. Every time the generation unit 63 generates acoustic-image localization information, the control unit 65 generates left-ear and right-ear audio contents based on the latest acoustic-image localization information and transmits the generated left-ear and right-ear audio contents to the left and right units 40L and 40R, respectively. Then, the control unit 65 controls the output unit(s) 42 of the left and right units 40L and 40R of the communication terminal 40 so as to output the left-ear and right-ear audio contents.

<Example of Operation of Server Apparatus>

Figure 6:
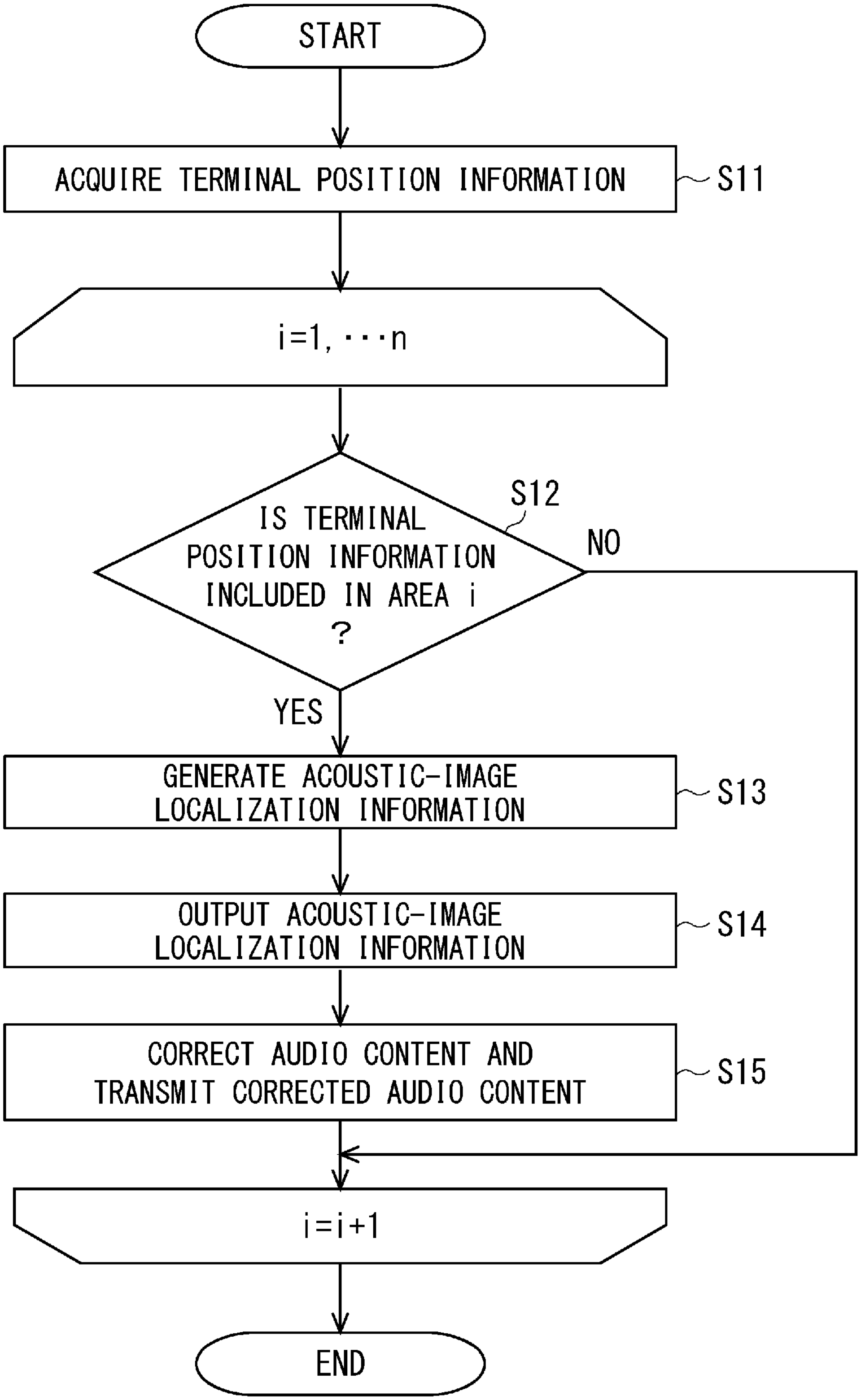
FIG. 6 is a flowchart showing an example of operations performed by a server apparatus according to the second example embodiment.

Next, an example of operations performed by the server apparatus 60 according to the second example embodiment will be described with reference to FIG. 6. FIG. 6 is a flowchart showing an example of operations performed by the server apparatus according to the second example embodiment. Every time the server apparatus 60 acquires terminal position information, it performs the example of the operations shown in FIG. 6. Note that the following description will be given on the assumption that: the storage unit 62 stores the acoustic-image localization relation table T1 in advance; n target areas (n is a natural number) are set (i.e., listed) in the acoustic-image localization relation table T1; and in FIG. 6, a variable i represents an area number.

The terminal information acquisition unit 61 acquires terminal position information (Step S11). The terminal information acquisition unit 61 acquires terminal position information by receiving it from the communication terminal 50.

The server apparatus 60 repeatedly performs steps S12 to S15 the number of times corresponding to the number of target areas.

The generation unit 63 determines whether or not the terminal position information is included in the area i (Step S12). The generation unit 63 determines whether or not the terminal position information is included in the area information of the area i by comparing the terminal position information with area information set (i.e., recorded) in a row (a record) in which the target area is the area i in the acoustic-image localization relation table T1.

When the terminal position information is included in the area information of the area i (Yes in Step S12), the generation unit 63 generates acoustic-image localization information (Step S13). The generation unit 63 acquires an original position (i.e., a position before the change) and change information in the row (the record) in which the target area is the area i in the acoustic-image localization relation table T1. The generation unit 63 determines changed acoustic-image localization position based on the acquired original position and the change information, and holds the determined changed acoustic-image localized position as acoustic-image localization position information. The generation unit 63 stores the acoustic-image localization position information in the storage unit 62 while associating it with the area i. The generation unit 63 generates acoustic-image localization information based on the acoustic-image localization position information and the terminal position information.

The output unit 64 outputs the acoustic-image localization information to the control unit 65 (Step S14).

The control unit 65 corrects the audio content and transmits the corrected audio content to the output unit 42 of the communication terminal 40 (Step S15).

The control unit 65 acquires, from the storage unit 62, an audio content corresponding to the audio content information set (i.e., recorded) in the row (the record) in which the target area is the area i in the acoustic-image localization relation table T1. When the audio content in the row (the record) in which the target area is the area i in the acoustic-image localization relation table T1 is an audio content to be generated (i.e., an audio content that should be generated), the control unit 65 generates the audio content. The control unit 65 corrects the acquired or generated audio content based on the acoustic-image localization information, and transmits the corrected audio content to the communication terminal 40.

Since the communication terminal 40 includes the left and right units 40L and 40R, the control unit 65 generates left-ear and right-ear audio contents and transmits them to the left and right units 40L and 40R, respectively, of the communication terminal 40. Every time the generation unit 63 generates acoustic-image localization information, the control unit 65 generates left-ear and right-ear audio contents based on the latest acoustic-image localization information and transmits them to the left and right units 40L and 40R, respectively.

When the step S15 is finished, the variable I, which indicates the area number, is incremented, and a loop process for the next area is performed.

In the step S12, when the terminal position information is not included in the area information of the area i (No in Step S12), the server apparatus 60 does not perform the processes in the steps S13 to S15, increments the variable i, and performs a loop process for the next area.

As described above, the server apparatus 60 specifies an area in which the terminal information is included based on the acoustic-image localization relation table T1, and generates acoustic-image localization information based on the acoustic-image localization position information, which has been determined by using the change information associated with the area, and the terminal position information. The server apparatus 60 corrects the audio content associated with this area based on the acoustic-image localization information, and outputs the corrected audio content toward the left and right ears of the user. In this way, the server apparatus 60 provides the audio content to the user in such a manner that the user feels, for example, as if the character C shown in FIG. 3 is moving. Therefore, according to the server apparatus 60 in accordance with the second example embodiment, it is possible to provide an experience close to one experienced in a real space to the user.

Further, by setting a row in the acoustic-image localization relation table T1 like the row for the Area 1 in FIG. 5, the server apparatus 60 can provide, to the user, an audio content in such a manner that the user feels as if the shop Sh shown in FIG. 3 virtually speaks to the user from the position at which the shop Sh is located. Therefore, according to the server apparatus 60 in accordance with the second example embodiment, it is possible provide a virtual experience that cannot be experienced in a real space to the user.

Third Example Embodiment

Next, a third example embodiment will be described. The third example embodiment is a modified example of the second example embodiment. While the server apparatus 60 performs an acoustic-image localizing process for an audio content in the second example embodiment, a communication terminal performs an acoustic-image localizing process for an audio content in the third example embodiment. Note that the third example embodiment includes components/structures and operations similar to those in the second example embodiment, and therefore descriptions thereof will be omitted as appropriate.

<Example of Configuration of Information Processing System>

Figure 7:
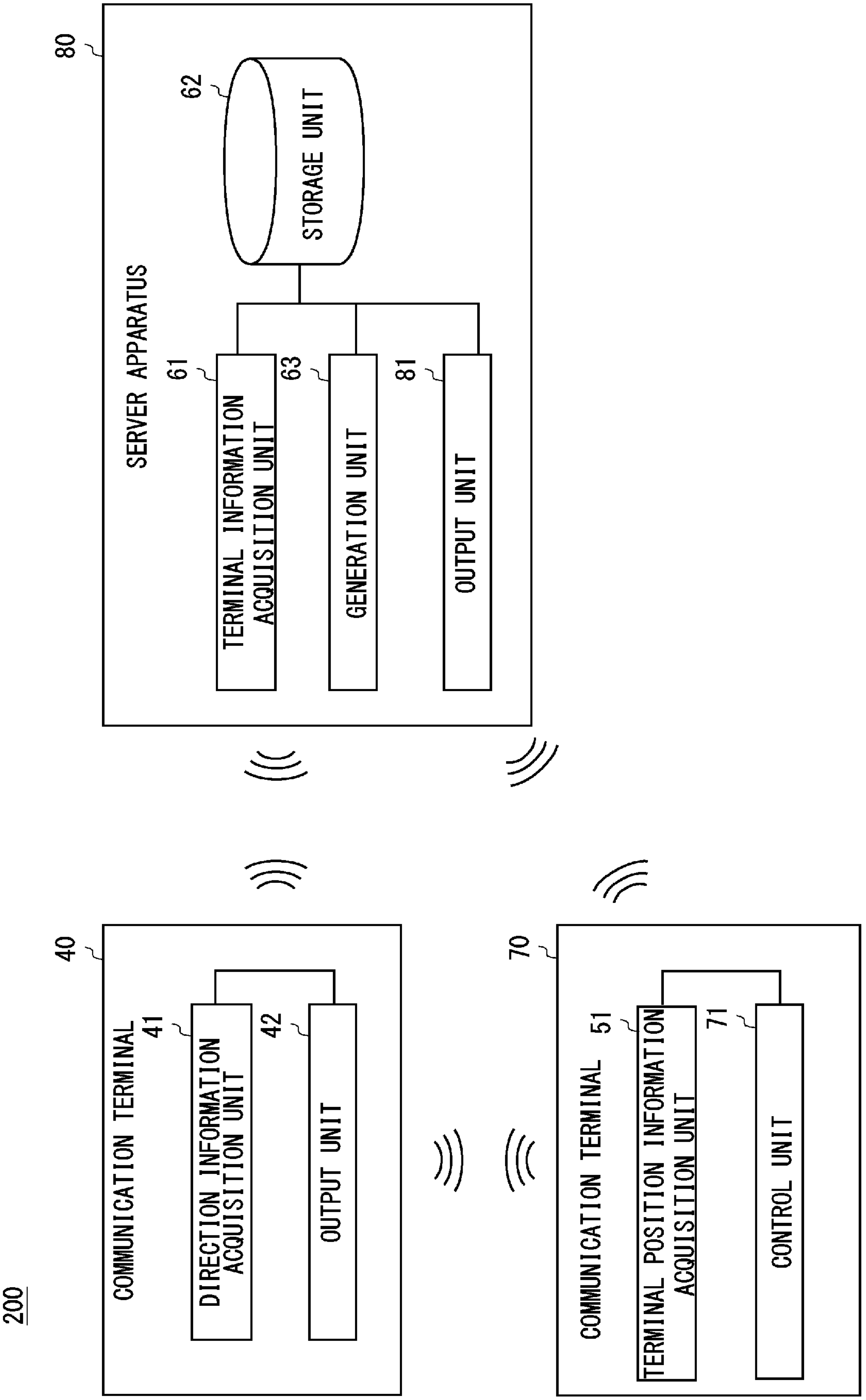
FIG. 7 shows an example of a configuration of an information processing system according to a third example embodiment.

An information processing system 200 according to the third example embodiment will be described with reference to FIG. 7. FIG. 7 shows an example of a configuration of the information processing system according to the third example embodiment. The information processing system 200 includes a communication terminal 40, a communication terminal 70, and a server apparatus 80. The information processing system 200 has a configuration that is obtained by replacing the communication terminal 50 and the server apparatus 60 according to the second example embodiment with the communication terminal 70 and the server apparatus 80, respectively. Examples of the configuration and operations of the communication terminal 40 are similar to those in the second example embodiment, and therefore descriptions thereof will be omitted as appropriate.

<Example of Configuration of Communication Terminal>

Next, an example of a configuration of the communication terminal 70 will be described. The communication terminal 70 includes a terminal position information acquisition unit 51 and a control unit 71. The communication terminal 70 has a configuration that is obtained by adding the control unit 71 to the configuration of the communication terminal 50 according to the second example embodiment. Since the configuration of the terminal position information acquisition unit 51 is similar to that in the second example embodiment, the description thereof will be omitted as appropriate. Note that although this example embodiment will be described on the assumption that the communication terminal 70 includes the control unit 71, the communication terminal 40 may include the control unit 71 and the communication terminal 70 may not include the control unit 71.

The control unit 71 communicates with the communication terminal 40 and the server apparatus 80. The control unit 71 receives an audio content and acoustic-image localization information from an output unit 81 of the server apparatus 80. The control unit 71 performs an acoustic-image localizing process for the audio content based on the acoustic-image localization information. In other words, the control unit 71 corrects the audio content based on the acoustic-image localization information.

Similarly to the second example embodiment, the acoustic-image localization information includes left-ear acoustic-image localization information and right-ear acoustic-image localization information. The control unit 71 generates a left-ear audio content by correcting the audio content based on the left-ear acoustic-image localization information. The control unit 71 generates a right-ear audio content by correcting the audio content based on the right-ear acoustic-image localization information.

The control unit 71 transmits the left-ear and right-ear audio contents to the left and right units 40L and 40R, respectively, of the communication terminal 40. Every time the output unit 81 generates acoustic-image localization information, the control unit 71 generates left-ear and right-ear audio contents based on the latest acoustic-image localization information and transmits them to the left and right units 40L and 40R, respectively. The control unit 71 controls the output unit(s) 42 of the left and right units 40L and 40R of the communication terminal 40 so as to output the left-ear and right-ear audio contents.

<Example of Configuration of Server Apparatus>

Next, an example of a configuration of the server apparatus 80 will be described. The server apparatus 80 includes a terminal information acquisition unit 61, a storage unit 62, a generation unit 63, and an output unit 81. The server apparatus 80 has a configuration that is obtained by removing the control unit 65, and replacing the output unit 64 with the output unit 81 in the configuration according to the second example embodiment. Since the configurations of the terminal information acquisition unit 61, the storage unit 62, and the generation unit 63 are similar to those in the second example embodiment, descriptions thereof will be omitted as appropriate.

The generation unit 63 acquires audio content information associated with area information including terminal position information in the acoustic-image localization relation table T1, and outputs the acquired audio content information to the output unit 81.

The output unit 81 also functions as a communication unit, so that it transmits (outputs), to the control unit 71, acoustic-image localization information including left-ear acoustic-image localization information and right-ear acoustic-image localization information generated by the generation unit 63. Every time the generation unit 63 generates acoustic-image localization information, the output unit 81 transmits the acoustic-image localization information to the control unit 71. The output unit 81 controls the control unit 71 so as to perform an acoustic-image localizing process by using the latest acoustic-image localization information.

The output unit 81 acquires, from the storage unit 62, an audio content corresponding to the audio content information output from the generation unit 63. When the audio content information output from the generation unit 63 is a content to be generated (i.e., an audio content that should be generated) like the Generated Content 4 in FIG. 5, the output unit 81 generates the audio content. The output unit 81 transmits the acquired or generated audio content to the control unit 71. Note that when the last audio content information transmitted to the control unit 71 and the audio content information output from the generation unit 63 are the same as each other, the output unit 81 does not have to transmit the audio content corresponding to the audio content information to the control unit 71.

<Example of Operation of Information Processing System>

Next, an example of operations performed by the information processing system 200 according to the third example embodiment will be described. The example of the operations performed by the information processing system 200 is basically similar to that shown in FIG. 6, and therefore it will be described with reference to FIG. 6.

Operations in steps S11 to S13 are similar to those in FIG. 6, and therefore the descriptions thereof will be omitted.

The output unit 81 outputs (transmits) acoustic-image localization information to the control unit 71 (Step S14). The output unit 81 transmits acoustic-image localization information generated by the generation unit 63 to the control unit 71. The output unit 81 acquires, from the storage unit 62, an audio content corresponding to audio content information in the row (the record) in which the target area is the area i in the acoustic-image localization relation table T1. When the audio content information in the row (the record) in which the target area is the area i in the acoustic-image localization relation table T1 is an audio content to be generated (i.e., an audio content that should be generated), the output unit 81 generates the audio content. The output unit 81 transmits the acquired or generated audio content to the control unit 71.

The control unit 71 corrects the audio content and transmits the corrected audio content to the output unit 42 of the communication terminal 40 (Step S15). The control unit 71 receives the audio content and the acoustic-image localization information from the output unit 81. The control unit 71 corrects the audio content based on the acoustic-image localization information, and transmits the corrected audio content to the communication terminal 40.

The control unit 71 generates a left-ear audio content and a right-ear audio content, and transmits them to the left and right units 40L and 40R, respectively, of the communication terminal 40. Every time the control unit 71 receives acoustic-image localization information from the output unit 81, the control unit 71 generates left-ear and right-ear audio contents based on the latest acoustic-image localization information and transmits them to the left and right units 40L and 40R, respectively.

As described above, even when the configuration according to the second example embodiment is modified to the one according to the third example embodiment, effects similar to those in the second example embodiment can be obtained.

The third example embodiment provides a configuration in which the communication terminal 70 performs the acoustic-image localizing process for the audio content. If the server apparatus 80 performs the acoustic-image localizing process for audio contents to be output to all communication terminals as in the second example embodiment, the processing load on the server apparatus 80 increases as the number of communication terminals increases. Therefore, it is necessary to increase the number of server apparatuses according to the number of communication terminals. In contrast to this, in the third example embodiment, since the server apparatus 80 does not perform the acoustic-image localizing process for the audio content and the communication terminal 70 instead performs the acoustic-image localizing process, so that it is possible to reduce the processing load on the server apparatus 80, and thereby to reduce the cost for the facility/equipment that would otherwise be required to increase the number of servers.

Further, it is possible to reduce the network load by adopting the configuration according to the third example embodiment. Specifically, as in the case of the Areas 2 and 3 in the acoustic-image localization relation table T1 shown in FIG. 5, it is conceivable that when the same audio content is used in a plurality of areas and the communication terminal 70 moves between the Areas 2 and 3, only the acoustic-image localization position is changed. Further, when time-series changes are set in change information in the acoustic-image localization relation table T1, only the acoustic-image localization position changes in a time-series manner while the audio content is unchanged. In this case, in the second example embodiment, even when only the acoustic-image localization information is updated, the server apparatus 60 has to transmit an audio content for which an acoustic-image localizing process has been performed to the communication terminal 40. In contrast to this, in the third example embodiment, the server apparatus 80 needs to transmit only the acoustic-image localization information. Therefore, it is possible to reduce the network load by adopting the configuration according to the third example embodiment.

Fourth Example Embodiment

Next, a fourth example embodiment will be described. The fourth example embodiment is an improved example of the example embodiment 2 or 3. Therefore, differences of the fourth example embodiment from the third example embodiment will be described with reference to the third example embodiment. The configuration of the fourth example embodiment is obtained by replacing the server apparatus 80 by a server apparatus 90 in the configuration according to the third example embodiment. Note that examples of the configurations of the information processing system and the communication terminals 40 and 70 according to the fourth example embodiment are basically similar to those in the third example embodiment. Therefore, descriptions of the examples of the configurations of the information processing system and the communication terminals 40 and 70 will be omitted as appropriate.

<Example of Configuration of Communication Terminal>

Although the example of the configuration of the communication terminal 40 is basically similar to that in the third example embodiment, the direction information acquisition unit 41 also transmits the acquired direction information to the server apparatus 60.

<Example of Configuration of Server Apparatus>

Figure 8:
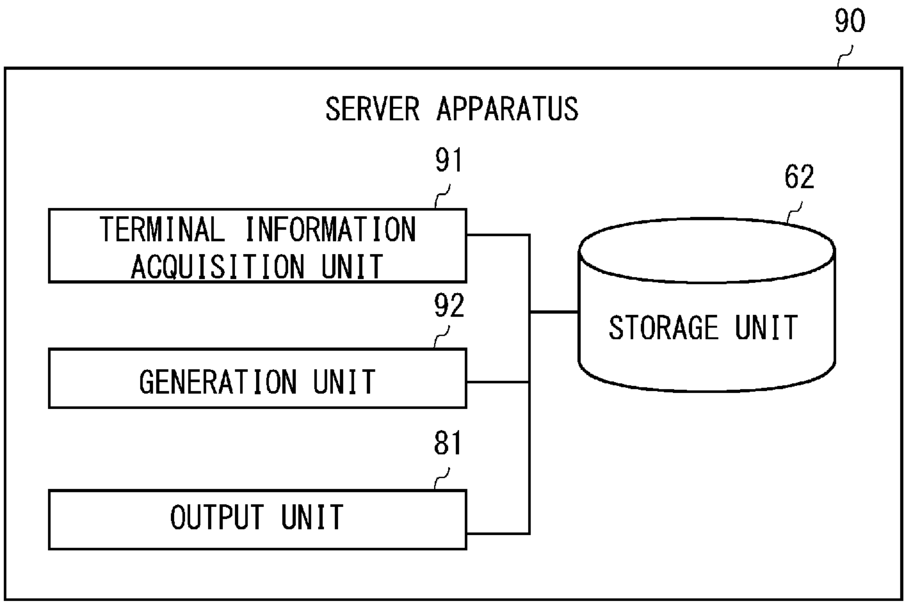
FIG. 8 shows an example of a configuration of a server apparatus according to a fourth example embodiment.

An example of a configuration of the server apparatus 90 will be described with reference to FIG. 8. FIG. 8 shows an example of the configuration of the server apparatus according to the fourth example embodiment. The server apparatus 90 includes a terminal information acquisition unit 91, a storage unit 62, a generation unit 92, and an output unit 81. Since the storage unit 62 and the output unit 81 are similar to those in the third example embodiment, descriptions thereof will be omitted.

The terminal information acquisition unit 91 receives direction information from the communication terminal 40.

In addition to the function in the third example embodiment, the generation unit 92 adjusts the acoustic-image localization position information.

Specifically, the generation unit 92 determines, based on area information in the acoustic-image localization relation table T1 and terminal position information, whether or not the terminal position information is included in the area information. When the terminal position information is included in the area information, the generation unit 92 determines changed acoustic-image localization position based on original position (i.e., a position before the change) and change information associated with the area information in the acoustic-image localization relation table T1, and holds the determined acoustic image localized position as acoustic-image localization position information. Note that the generation unit 92 stores acoustic-image localization position information in the storage unit 62 while associating the acoustic-image localization position information with the area information (the target area) in which terminal position information is included.

The generation unit 92 determines whether or not the changed acoustic-image localization position (the acoustic-image localization position information) needs to be adjusted. When the generation unit 92 determines that the acoustic-image localization position information needs to be adjusted, it adjusts the acoustic-image localization position information. When the generation unit 92 has adjusted the changed acoustic-image localization position, it holds the adjusted acoustic-image localization position as acoustic-image localization position information. The generation unit 92 stores the acoustic-image localization position information in the storage unit 62 while associating it with the area information (the target area) in which the terminal position information is included. Then, the generation unit 92 generates acoustic-image localization information based on the acoustic-image localization position information and the terminal position information.

The generation unit 92 may determine whether or not the acoustic-image localization position information needs to be adjusted according to the distance between the communication terminal position information and the acoustic-image localization position information, and adjust, when necessary, the acoustic-image localization position information. The generation unit 92 determines the changed acoustic-image localization position based on the change information set (i.e., recorded) in the acoustic-image localization relation table T1, and the change distance (i.e., the distance of the change) from the original acoustic image localized position (i.e., the acoustic image localized position before the change) may be set in the change information set in the acoustic-image localization relation table T1. Therefore, when the original acoustic image localized position is far from the terminal position information, there is a possibility that the generation unit 92 sets the changed acoustic-image localization position at a position far from the position of the communication terminal 40. Therefore, when the distance between the terminal position information and the acoustic-image localization position information is equal to or longer than a predetermined value, the generation unit 92 may determine that the acoustic-image localization position information needs to be adjusted and adjust the acoustic-image localization position information so that the distance between the terminal position information and the acoustic-image localization position information becomes equal to the predetermined value.

Further, when characteristic information of the target area is set in the area information set (i.e., recorded) in the acoustic-image localization relation table T1, the generation unit 92 may determine whether or not the acoustic-image localization position information needs to be adjusted based on the characteristic information of the target area including the terminal position information and the current time (i.e., the time at the present moment), and adjust, when necessary, the acoustic-image localization position information.

When the current time is included in the time period included (i.e., specified) in the characteristic information of the target area including the terminal position information and the distance between the terminal position information and the acoustic-image localization position information is equal to or longer than the predetermined value, the generation unit 92 may determine that the acoustic-image localization position information needs to be adjusted. Then, the generation unit 92 may adjust the acoustic-image localization position information so that the changed acoustic image localized position gets closer to the communication terminal. Alternatively, when the current time is included in the time period included in the characteristic information and the distance between the terminal position information and the acoustic-image localization position information is shorter than a predetermined value, the generation unit 92 may determine that the acoustic-image localization position information needs to be adjusted. Then, the generation unit 92 may adjust the acoustic-image localization position information so that the changed acoustic-image localization position gets away from (i.e., recedes from) the communication terminal.

In this way, for example, when the target area including the terminal position information is an area where night view is beautiful and the virtual character is a virtual boyfriend/girlfriend, the generation unit 92 can adjust the acoustic-image localization position information so that the boyfriend/girlfriend moves closer to the user, thus making it possible to provide an experience closer to one experienced in a real space to the user. Further, for example, when the target area including the terminal position information is crowded during the daytime, the generation unit 92 can adjust the acoustic-image localization position information so that the user feels that the virtual character speaks in a more easily-to-listen manner, thus making it possible to provide an experience closer to one experienced in a real space to the user. Alternatively, for example, when the target area including the terminal position information is quiet (i.e., is not crowded at all) during a certain time period, the generation unit 92 can adjust the acoustic-image localization position information so that the user feels that the virtual character has changed its standing position to a different position in consideration of the congestion state, thus making it possible to provide an experience closer to one experienced in a real space to the user.

Further, the generation unit 92 may determine whether or not the acoustic-image localization position information needs to be adjusted based on altitude information included in the terminal position information, and adjust, when necessary, the acoustic-image localization position information. Specifically, when the height of the communication terminal with respect to the horizontal plane changes based on the altitude information, the generation unit 92 may determine that the acoustic-image localization position information needs to be adjusted and adjust the acoustic-image localization position information.

For example, it is conceivable that the target area including the terminal position information is an area where there is a step. When the position of the communication terminal is raised with respect to the horizontal plane based on the altitude information, the generation unit 92 may adjust the acoustic-image localization position information so that the changed acoustic-image localization position becomes lower than the position of the communication terminal. Alternatively, when the position of the communication terminal is lowered with respect to the horizontal plane based on the altitude information, the generation unit 92 may adjust the acoustic-image localization position information so that the changed acoustic-image localization position becomes higher than the position of the communication terminal. In this way, for example, when the target area including the terminal position information is an area where there are a lot of steps, the generation unit 63 can adjust the acoustic-image localization position information according to the step, thus making it possible to provide an experience closer to one experienced in a real space to the user.

Further, the generation unit 92 may determine whether or not the acoustic-image localization position information needs to be adjusted based on direction information, and adjust, when necessary, the acoustic-image localization position information. When the communication terminal 40 is moving away from (i.e., receding from) the target object based on at least one of the terminal position information and the direction information, the generation unit 92 may determine that the acoustic-image localization position information needs to be adjusted, and adjust the acoustic-image localization position information in the direction toward the target object with respect to the terminal position information. The target object is, for example, the building O shown in FIG. 3. In this way, it is possible, when the user who possesses the communication terminal 40 has passed the building O, to make the user aware of that he/she has already passed the building O. In this case, for example, the generation unit 92 may make an adjustment so that a special-purpose audio content such as "Building O is this way" is output.

Further, the generation unit 92 may determine whether or not the acoustic-image localization position information needs to be adjusted based on the distance between the terminal position information and the position information of the target object (target object position information) and the direction from the communication terminal 40 toward the target object (a target object direction), and adjust, when necessary, the acoustic-image localization position information. When the distance between the terminal position information and the target object position information becomes equal to a predetermined distance, and the direction specified by the direction information is coincident with the target object direction with respect to the communication terminal 40, the generation unit 92 may adjust the acoustic-image localization position information so that the changed acoustic-image localization position is not set in the target object direction. In other words, when the distance between the terminal position information and the target object position information becomes equal to the predetermined distance, and the direction indicated by the direction information is coincident with the target object direction with respect to the communication terminal 40, the generation unit 92 may adjust the acoustic-image localization position information so that the changed acoustic-image localization position is set at a position different from the target object direction.

Note that, in such a case, the generation unit 92 may be configured so as to detect a change in the direction information included in the terminal position information, and may adjust the acoustic-image localization position information so that the acoustic-image localization position information is not set in the target object direction at the timing at which the direction specified by the direction information becomes coincident with the target object direction. Alternatively, the generation unit 92 may adjust the acoustic-image localization position information so that the acoustic-image localization position information is not set in the target object direction at a timing at which the terminal position information does not change for a predetermined time.

In this way, the generation unit 92 can make an adjustment so that when the user who possesses the communication terminal 40 is in a position where he/she can see the building O, no audio content is heard from the direction in which the user sees the building O. That is, the generation unit 92 can prevent the user from seeing the target object such as the building O with interest.

<Example of Operation of Information Processing System>

Figure 9:
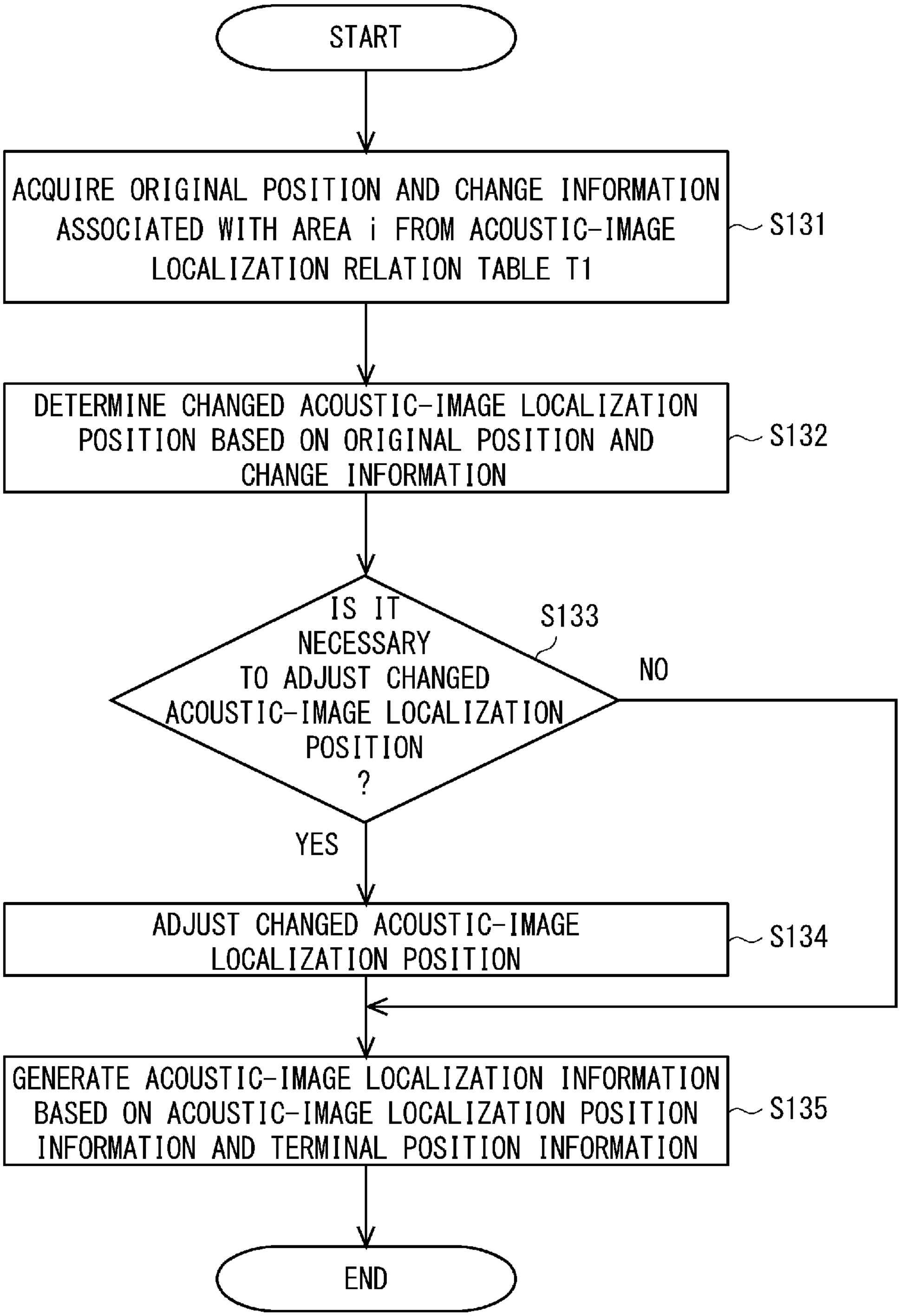
FIG. 9 is a flowchart for explaining details of an operation in a process for generating acoustic-image localization information according to the fourth example embodiment.

Next, an example of operations performed by the information processing system according to the fourth example embodiment will be described with reference to FIGS. 6 and 9. Firstly, the information processing system according to the fourth example embodiment performs the example of operations shown in FIG. 6, but the details of the operation in the step S13 are different from those of the operation in FIG. 6. The details of the operation in the step S13 in FIG. 6 will be described with reference to FIG. 9. FIG. 9 is a flowchart for explaining detailed operations in a process for generating acoustic-image localization information according to the fourth example embodiment. The operations shown in FIG. 9 are performed by the generation unit 92.

In a step S12, when the generation unit 92 determines that the terminal position information is included in the area i (Yes in Step S12), the generation unit 92 acquires original position (i.e., a position before the change) and change information associated with the area i from the acoustic-image localization relation table T1 (Step S131).

The generation unit 92 determines changed acoustic-image localization position based on the acquired original position and the change information, and holds the determined changed acoustic-image localization position as acoustic-image localization position information (Step S132).

The generation unit 92 determines whether or not the changed acoustic-image localization position needs to be adjusted (Step S133).

The generation unit 92 may determine whether or not the acoustic-image localization position information needs to be adjusted according to the distance between the communication terminal position information and the acoustic-image localization position information. Alternatively, when characteristic information of the target area is set in the area information set (i.e., recorded) in the acoustic-image localization relation table T1, the generation unit 92 may determine whether or not the acoustic-image localization position information needs to be adjusted based on the characteristic information of the target area including the terminal position information and the current time (i.e., the time at the present moment). Alternatively, the generation unit 92 may determine whether or not the acoustic-image localization position information needs to be adjusted based on altitude information included in the terminal position information. Alternatively, the generation unit 92 may determine whether or not the acoustic-image localization position information needs to be adjusted or not based on direction information. Alternatively, the generation unit 92 may determine whether or not the acoustic-image localization position information needs to be adjusted based on the distance between the terminal position information and the target object position information, and the communication terminal 40 and the target object direction, and adjust, when necessary, the acoustic-image localization position information.

When the generation unit 92 determines that the changed acoustic-image localization position needs to be adjusted (Yes in Step S133), it adjusts the changed acoustic-image localization position and holds the adjusted acoustic-image localization position as adjusted acoustic-image localization position information (Step S134).

On the other hand, the generation unit 92 determines that the changed acoustic-image localization position does not need to be changed (No in Step S133), the generation unit 92 skips the step S134 and performs a step S135.

The generation unit 92 generates acoustic-image localization information based on the acoustic-image localization position information and the terminal position information (Step S135). When the generation unit 92 generates the acoustic-image localization information, it outputs the generated acoustic-image localization information to the output unit 81.

As described above, in addition to determining the changed acoustic-image localization position based on the original position and the change information set in the acoustic-image localization relation table T1, the generation unit 92 adjusts the determined changed acoustic-image localization position. As described above, since the generation unit 92 adjusts the changed acoustic-image localization position, it is possible to provide, to the user, an experience that is closer to one experienced in a real space than that provided in the third example embodiment.

Further, as described above, the generation unit 92 adjusts the changed acoustic-image position so as to make the user aware that he/she has passed the target object such as the building O, and/or adjusts the changed acoustic-image position so as to prevent the user from seeing the target object such as the building O with interest. Therefore, according to the server apparatus 90 in accordance with the fourth example embodiment, it is possible to provide, to the user, an experience that is closer to one experienced in a real space than that provided in the third example embodiment, and thereby to provide a user-friendly service to the user.

MODIFIED EXAMPLE

The generation unit 92 according to the fourth example embodiment may be modified so as to adjust the acoustic-image localization position information based on relevant information related to the audio content output for the user who possesses the communication terminal 40.

The generation unit 92 may adjust the acoustic-image localization position information according to the length of the audio content. In the case where the audio content is an audio content to be generated (i.e., an audio content that should be generated), it is conceivable that the length of the audio content may be long or may be short. Therefore, the generation unit 92 acquires the generated audio content and checks the length of the audio content. Then, when the length of the audio content is longer than a predetermined time, the generation unit 92 may adjust the acoustic-image localization position information so that it gets closer to the terminal position information. On the other hand, when the length of the audio content is shorter than a predetermined time, the generation unit 92 may adjust the acoustic-image localization position information so that it gets away from (recedes from) the terminal position information. In this way, when the audio content is long, the generation unit 92 can make an adjustment so that the user listens to the audio content more carefully.

Further, when the audio content output for the user is an audio content related to a virtual character, the generation unit 92 may adjust the acoustic-image localization position information according to the degree of intimacy (or closeness) between the user who possesses the communication terminal 40 and this virtual character. The degree of intimacy may be set according to the length of time for which the user has used the aforementioned character. The generation unit 92 sets the degree of intimacy so that the degree of intimacy increases as the time for which the user has used the aforementioned character increases. Further, the generation unit 92 may adjust the acoustic-image localization position information in such a manner that the higher the degree of intimacy is, the closer the acoustic-image localization position gets (i.e., moves) to the position of the communication terminal 40.

Fifth Example Embodiment

Next, a fifth example embodiment will be described. The fifth example embodiment is an improved example of any of the above-described second to fourth example embodiments. While the server apparatus is configured to output only an audio content for a user in the second to fourth example embodiments, a server apparatus according to this example embodiment also outputs display information to a user. In the following description, differences from the third example embodiment will be described with reference to the third example embodiment.

<Example of Configuration of Information Processing System>

Figure 10:
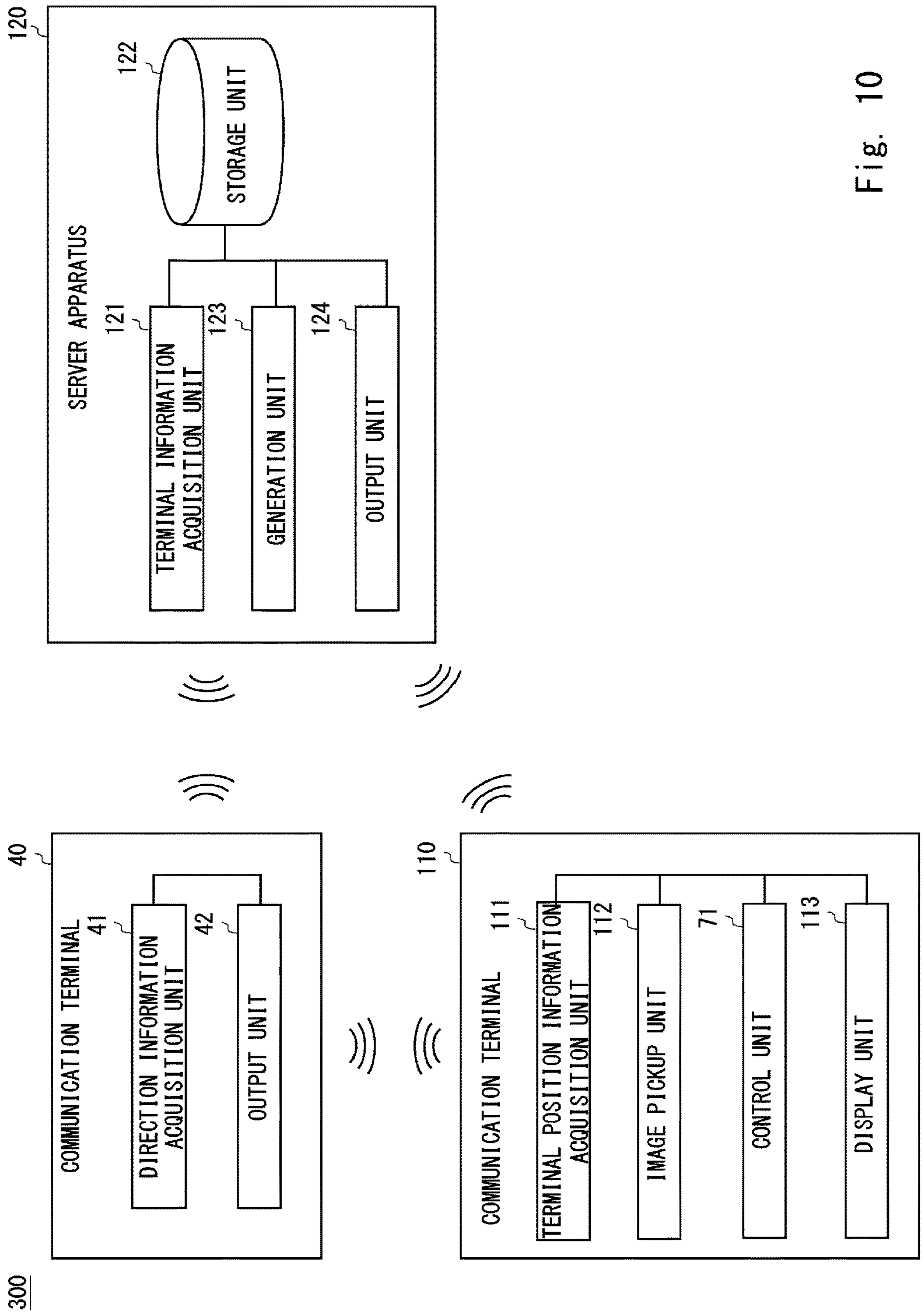
FIG. 10 shows an example of a configuration of an information system according to a fifth example embodiment.

An example of a configuration of an information processing system 300 according to the fifth example embodiment will be described with reference to FIG. 10. FIG. 10 shows an example of the configuration of the information processing system according to the fifth example embodiment. The information processing system 300 has a configuration that is obtained by replacing the communication terminal 70 and the server apparatus 80 with a communication terminal 110 and a server apparatus 120, respectively, in the third example embodiment. Note that since the example of the configuration of the communication terminal 40 is similar to that in the third example embodiment, the description thereof will be omitted as appropriate.

<Example of Configuration of Communication Terminal>

Next, an example of a configuration of the communication terminal 110 will be described. The communication terminal 110 has a configuration that is obtained by adding an image pickup unit 112 and a display unit 113, and replacing the terminal position information acquisition unit 51 with a terminal position information acquisition unit 111 in the configuration of the communication terminal 70 according to the third example embodiment. Note that since the configuration of the control unit 71 is similar to that in the third example embodiment, the description thereof will be omitted as appropriate.

In addition to the function of the terminal position information acquisition unit 51 according to the third example embodiment, the terminal position information acquisition unit 111 acquires direction information of the communication terminal 110. The terminal position information acquisition unit 111 includes, for example, a 9-axis sensor as in the case of the communication terminal 40, and acquires direction information of the communication terminal 110. The terminal position information acquisition unit 111 also transmits the direction information of the communication terminal 110 to the server apparatus 120. Further, the terminal position information acquisition unit 111 also includes the terminal position information of the communication terminal 110 in the terminal position information, and transmits the terminal position information to the server apparatus 120. Note that since the direction information of the communication terminal 110 coincides with the shooting direction (i.e., the photographing direction) of the image pickup unit 112, the direction information of the communication terminal 110 is also referred to as shooting direction information.

The image pickup unit 112 includes, for example, a camera or the like. The image pickup unit 112 shoots (i.e., photographs or films) a predetermined range and generates a photograph image thereof. The image pickup unit 112 outputs the generated photograph image to the display unit 113. The image pickup unit 112 transmits the generated photograph image to a terminal information acquisition unit 121 of the server apparatus 120 through the terminal position information acquisition unit 111 or the control unit 71. Note that the photograph image may be a still image or a moving image.

The display unit 113 includes, for example, a display or the like. The display unit 113 displays the photograph image taken by the image pickup unit 112 on the display. Further, the display unit 113 receives display information generated by the server apparatus 120 and displays the received display information on the display. In the display information, coordinates with respect to reference coordinates defined in the photograph image are associated with video AR (Augmented Reality) information. The display unit 113 superimposes the video AR information at the aforementioned coordinates on the photograph image generated by the image pickup unit 112, and displays them on the display.

<Example of Configuration of Server Apparatus>

Next, an example of a configuration of the server apparatus 120 will be described. The server apparatus 120 includes a terminal information acquisition unit 121, a storage unit 122, a generation unit 123, and an output unit 124. The terminal information acquisition unit 121, the storage unit 122, the generation unit 123, and the output unit 124 have configurations corresponding to those of the terminal information acquisition unit 61, the storage unit 62, the generation unit 63, and the output unit 81, respectively, according to the third example embodiment.

The terminal information acquisition unit 121 has a configuration corresponding to that of the terminal information acquisition unit 61 in the third example embodiment, and further acquires the photograph image and the shooting direction information from the communication terminal 110. The terminal information acquisition unit 121 outputs the acquired photograph image and the shooting direction information to the generation unit 123.

The storage unit 122 stores an acoustic-image localization relation table T2. The acoustic-image localization relation table T2 is a table corresponding to the acoustic-image localization relation table T1 according to the third example embodiment.

An example of the acoustic-image localization relation table T2 will be described hereinafter with reference to FIG. 11. FIG. 11 shows an example of the acoustic-image localization relation table according to the fifth example embodiment. As shown in FIG. 11, the acoustic-image localization relation table T2 is a table that is obtained by adding a video AR information column to the acoustic-image localization relation table T1 according to the third example embodiment. In the video AR information column, pieces of video AR information associated with target areas are set.

The generation unit 123 will be described by referring FIG. 10 again. The generation unit 123 has a configuration that is obtained by adding a function of generating display information to the function of the generation unit 63 according to the third example embodiment. When there is a target area including terminal position information, the generation unit 123 determines whether or not a changed acoustic image localized position determined based on changed position and change information associated with this target area is included in the photograph image. When there is a target area including the terminal position information, the generation unit 123 determines, based on the terminal position information and the shooting direction information of the communication terminal 110, whether or not the changed acoustic image localized position determined based on the changed position and the change information associated with this target area is included in the photograph image.

When the changed acoustic-image localization position is included in the photograph image, the generation unit 123 acquires video AR information set (i.e., recorded) in the acoustic-image localization relation table T2. The generation unit 123 defines reference coordinates on the photograph image, and determines coordinates corresponding to the changed acoustic-image localization position with respect to the reference coordinates. The generation unit 123 generates the display information by associating the determined coordinates with the acquired video AR information. The generation unit 123 outputs the display information to the output unit 124.

The output unit 124 has a configuration that is obtained by adding a function of outputting display information to the function of the generation unit 63 according to the third example embodiment. The output unit 124 outputs (transmits) the display information generated by the generation unit 123 to the control unit 71.

<Example of Operation of Information Processing System>

Figure 12:
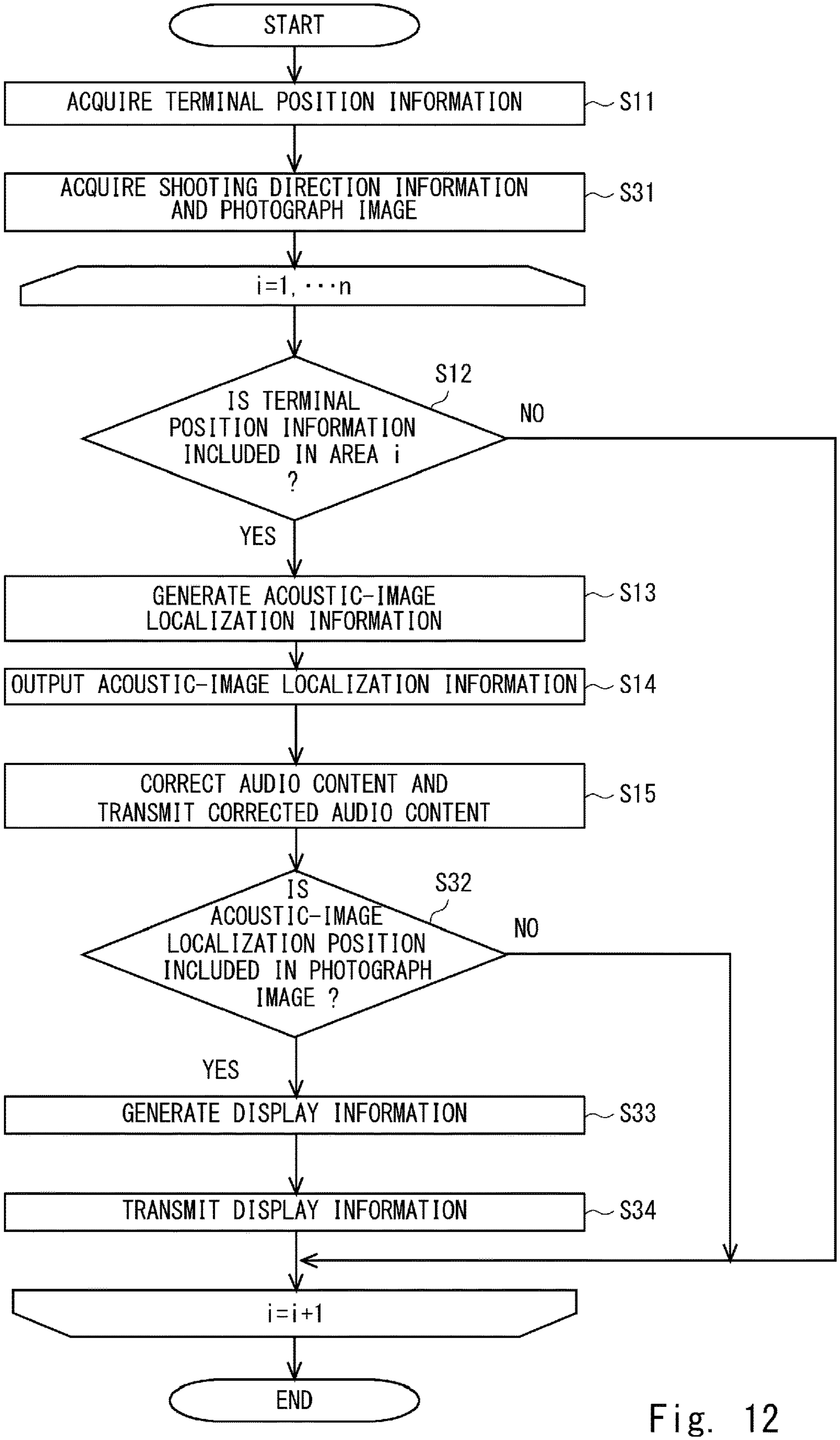
FIG. 12 is a flowchart showing an example of operations performed by an information processing system according to the fifth example embodiment.

Next, an example of operations performed by the information processing system 300 according to the fifth example embodiment will be described with reference to FIG. 12. FIG. 12 is a flowchart showing an example of operations performed by the information processing system according to the fifth example embodiment. FIG. 12 is a flowchart that is obtained by adding steps S31 to S34 in the example of operations performed by the information processing system according to the third example embodiment. Steps S11 to S15 are similar to those in the third example embodiment, and therefore the descriptions thereof will be omitted as appropriate in the following description.

In a step S31, the terminal information acquisition unit 121 acquires a photograph image generated by the image pickup unit 112 and shooting direction information from the communication terminal 110 (Step S31). The terminal information acquisition unit 121 outputs the photograph image generated by the image pickup unit 112 and the shooting direction information to the generation unit 123.

In a step S32, the generation unit 123 determines whether or not changed acoustic-image localization position is included in the photograph image (Step S32). In a step S13, the generation unit 123 determines the changed acoustic-image localization position based on the original position (i.e., the position before the change) and the change information set (i.e., recorded) in the record in which the target area is the area i in the acoustic-image localization relation table T2. The generation unit 123 determines, by using the terminal position information of the communication terminal 110, the photograph image, the shooting direction information, and the changed acoustic-image localization position, whether or not the changed acoustic-image localization position is included in the photograph image.

When the changed acoustic-image localization position is included in the photograph image (Yes in Step S32), the generation unit 123 generates display information (Step S33). When the changed acoustic-image localization position is included in the photograph image, the generation unit 123 acquires video AR information set (i.e., recorded) in the record of the area i in the acoustic-image localization relation table T2. The generation unit 123 defines reference coordinates on the photograph image, and determines coordinates corresponding to the changed acoustic image localized position with respect to the reference coordinates. The generation unit 123 generates the display information by associating the determined coordinates with the video AR information. The generation unit 123 outputs the display information to the output unit 124.

The output unit 124 outputs (transmits) the display information generated by the generation unit 123 to the control unit 71 (Step S34), and increments the variable i.

On the other hand, in the step S32, when the changed acoustic-image localization position is not included in the photograph image (No in Step S32), the steps S33 and S34 are not performed while the variable i is incremented.

As described above, in this example embodiment, the server apparatus 120 generates not only the audio content but also the display information, and when the acoustic-image localization position is included in the photograph image, displays video AR information at the acoustic image localized position. Therefore, according to the information processing system 300 in accordance with the fifth example embodiment, in addition to the audio content, the video AR information is also displayed, so that it is possible provide, in addition to an experience close to one experienced in a real space, a new experience that cannot be experienced in a real space to the user.

MODIFIED EXAMPLE

Although the server apparatus 120 determines whether or not the changed acoustic-image localization position is included in the photograph image based on the direction information of the communication terminal 110 in the above-described fifth example embodiment, the server apparatus 120 may determine whether or not the changed acoustic-image localization position is included in the photograph image by using an AR marker. In such a case, the AR marker is disposed at a position corresponding to the changed acoustic-image localization position. When an AR marker is included in a photograph image, the generation unit 123 determines that a changed acoustic-image localization position is included in the photograph image. Then, the generation unit 123 generates display information by associating video AR information associated with the aforementioned changed acoustic-image localization position with the coordinates in the photograph image corresponding to a predetermined position that is determined based on the position where the AR marker is disposed. The predetermined position may be determined in an arbitrary manner, e.g., may be coincident with the position where the AR marker is disposed or may be a position to which it is desired to attract user's attention.

Further, the image pickup unit 112 of the communication terminal 110 may determine whether or not an AR marker is included in a photograph image. When the image pickup unit 112 determines that an AR marker is included in a photograph image, the display unit 113 may display video AR information recorded in the AR marker at a predetermined position on the display that is determined based on the position of the AR marker.

Alternatively, when the image pickup unit 112 determines that an AR marker is included in a photograph image, it transmits the photograph image and the position of the AR marker on the photograph image to the terminal information acquisition unit 121. Then, the generation unit 123 may generate display information by associating video AR information associated with the aforementioned changed acoustic-image localization position with the coordinates on the photograph image corresponding to the predetermined position that is determined based on the position where the AR marker is disposed.

Other Example Embodiment

<1> Although the above-described example embodiments have been described on the assumption that the generation unit generates acoustic-image localization position information, the generation unit may instead perform a process for selecting corresponding acoustic-image localization position information from a plurality of pieces of acoustic-image localization position information held (i.e., stored) in advance. For example, when the moving direction of a user is limited, required acoustic-image localization position information is also limited. Therefore, a holding unit or a storage unit holds pieces of acoustic-image localization position information that will be possibly used in advance. Then, the generation unit performs a process for selecting corresponding acoustic-image localization position information based on terminal position information. In this way, it is possible to reduce the processing load on the information processing apparatus or the server apparatus.

Figure 13:
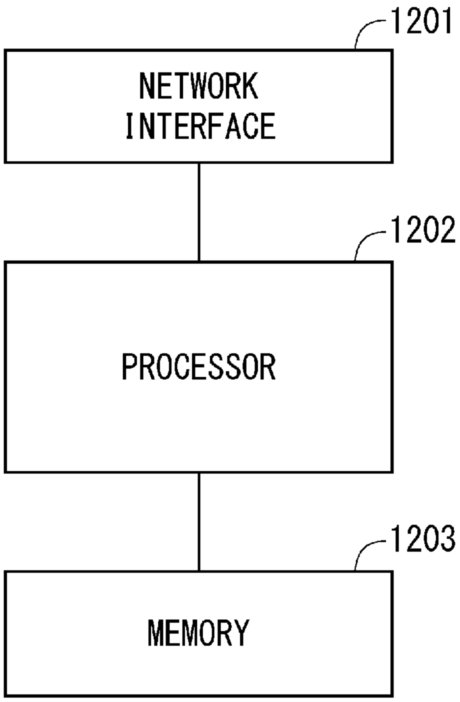
FIG. 13 is a block diagram showing an example of a hardware configuration of an information processing apparatus or the like according to each example embodiment of the present disclosure.

<2> Each of the information processing apparatus 1, the communication terminals 40, 50, 70 and 110, and the server apparatuses 60, 80, 90 and 120 (hereinafter referred to as the information processing apparatus 1 and the like) described in the above-described example embodiments may have a hardware configuration described below. FIG. 13 is a block diagram for explaining a hardware configuration of an information processing apparatus or the like according to each example embodiment of the present disclosure.

Referring to FIG. 13, the information processing apparatus 1 or the like includes a network interface 1201, a processor 1202, and a memory 1203. The network interface 1201 is used to communicate with other communication apparatuses having communication functions. The network interface 1201 may include, for example, a network interface card (NIC) in conformity with communication modes including IEEE (Institute of Electrical and Electronics Engineers) 802.11 series and IEEE 802.3 series.

The processor 1202 may load software (a computer program) from the memory 1203 and execute the loaded software, thereby performing the processes of the information processing apparatus 1 or the like described by using the flowchart in the above-described example embodiments. The processor 1202 may be, for example, a microprocessor, an MPU (Micro Processing Unit), or a CPU (Central Processing Unit). The processor 1202 may include a plurality of processors.

The memory 1203 is composed of a combination of a volatile memory and a nonvolatile memory. The memory 1203 may include a storage located remotely from the processor 1202. In such a case, the processor 1202 may access the memory 1203 through an I/O interface (not shown).

In the example shown in FIG. 13, the memory 1203 is used to store a group of software modules. The processor 1202 can perform the processes of the information processing apparatus 1 or the like described in the above-described example embodiments by loading the group of software modules from the memory 1203 and execute the loaded software modules.

As described above with reference to FIG. 13, each of the processors included in the information processing apparatus 1 and the like performs one or a plurality of programs including a set of instructions for causing a computer to perform the algorithm described above with reference to the drawings.

In the above-described examples, the program may be stored in various types of non-transitory computer readable media and thereby supplied to the computer. The non-transitory computer readable media includes various types of tangible storage media. Examples of the non-transitory computer readable media include a magnetic recording medium (such as a flexible disk, a magnetic tape, and a hard disk drive) and a magneto-optic recording medium (such as a magneto-optic disk). Further, examples of the non-transitory computer readable media include CD-ROM (Read Only Memory), CD-R, and CD-R/W. Further, examples of the non-transitory computer readable media include a semiconductor memory. The semiconductor memory includes, for example, a mask ROM, a PROM (Programmable ROM), an EPROM (Erasable PROM), a flash ROM, and a RAM (Random Access Memory). These programs may be supplied to the computer by using various types of transitory computer readable media. Examples of the transitory computer readable media include an electrical signal, an optical signal, and an electromagnetic wave. The transitory computer readable media can be used to supply programs to the computer through a wired communication line (e.g., electric wires and optical fibers) or a wireless communication line.

Although the present invention is explained above with reference to example embodiments, the present invention is not limited to the above-described example embodiments. Various modifications that can be understood by those skilled in the art can be made to the configuration and details of the present invention within the scope of the invention. Further, the present disclosure may also be implemented by combining any two or more of the example embodiments with one another as desired.

Further, the whole or part of the example embodiments disclosed above can be described as, but not limited to, the following supplementary notes.

(Supplementary Note 1)

An information processing apparatus comprising:

an acquisition unit configured to acquire terminal position information of a communication terminal;

a holding unit configured to hold a predetermined area and acoustic-image localization position information of an audio content to be output to the communication terminal while associating them with each other;

a generation unit configured to generate acoustic-image localization information based on the acoustic-image localization position information and the terminal position information when the terminal position information is included in the predetermined area; and an output unit configured to output the acoustic-image localization information.

(Supplementary Note 2)

The information processing apparatus described in Supplementary note 1, wherein the generation unit adjusts the acoustic-image localization position information according to a distance between the terminal position information and the acoustic-image localization position information.

(Supplementary Note 3)

The information processing apparatus described in Supplementary note 1 or 2, wherein when the communication terminal is moving away from a target object based on the terminal position information and position information of the target object, the generation unit adjusts the acoustic-image localization position information in a direction toward the target object with respect to the terminal position information.

(Supplementary Note 4)

The information processing apparatus described in any one of Supplementary notes 1 to 3, wherein the acquisition unit acquires direction information of the communication terminal, and the generation unit adjusts, when a distance between the terminal position information and position information of a target object becomes equal to a predetermined distance, and a direction indicated by the direction information is coincident with a target object direction indicating a direction of the target object with respect to the terminal position information, the acoustic-image localization position information so that the acoustic-image localization position information is not set in the target object direction.

(Supplementary Note 5)

The information processing apparatus described in Supplementary note 4, wherein the generation unit adjusts the acoustic-image localization position information at a timing at which the direction information changes and the direction indicated by the direction information becomes coincident with the target object direction.

(Supplementary Note 6)

The information processing apparatus described in Supplementary note 4 or 5, wherein the generation unit adjusts the acoustic-image localization position information at a timing at which the position information does not change for a predetermined time.

(Supplementary Note 7)

The information processing apparatus described in any one of Supplementary notes 1 to 6, wherein the terminal position information includes altitude information, and the generation unit adjusts the acoustic-image localization position information according to a change in the altitude information.

(Supplementary Note 8)

The information processing apparatus described in any one of Supplementary notes 1 to 7, wherein the generation unit adjusts the acoustic-image localization position information according to a length of the audio content.

(Supplementary Note 9)

The information processing apparatus described in any one of Supplementary notes 1 to 8, wherein the audio content includes an audio content related to a virtual object, and when the audio content related to the virtual object is output to the communication terminal, the generation unit adjusts the acoustic-image localization position information according to a degree of intimacy between a user possessing the communication terminal and the virtual object.

(Supplementary Note 10)

The information processing apparatus described in any one of Supplementary notes 1 to 9, wherein the acquisition unit acquires a photograph image taken by the communication terminal, when a position corresponding to the acoustic-image localization position information is included in the photograph image, the generation unit generates display information related to the audio content, and the output unit outputs the display information to the communication terminal.

(Supplementary Note 11)

A control method comprising:

acquiring terminal position information of a communication terminal;

holding a predetermined area and acoustic-image localization position information of an audio content to be output to the communication terminal while associating them with each other;

generating acoustic-image localization information based on the acoustic-image localization position information and the terminal position information when the terminal position information is included in the predetermined area; and outputting the acoustic-image localization information.

(Supplementary Note 12)

A control program for causing a computer to perform:

acquiring terminal position information of a communication terminal;

holding a predetermined area and acoustic-image localization position information of an audio content to be output to the communication terminal while associating them with each other;

generating acoustic-image localization information based on the acoustic-image localization position information and the terminal position information when the terminal position information is included in the predetermined area; and outputting the acoustic-image localization information.

This application is based upon and claims the benefit of priority from Japanese patent application No. 2019-229636, filed on Dec. 19, 2019, the disclosure of which is incorporated herein in its entirety by reference.

REFERENCE SIGNS LIST

1 INFORMATION PROCESSING APPARATUS
2 ACQUISITION UNIT
3 HOLDING UNIT
4, 63, 92, 123 GENERATION UNIT
5, 42, 64, 81, 124 OUTPUT UNIT
40, 50, 70, 110 COMMUNICATION TERMINAL
41 DIRECTION INFORMATION ACQUISITION UNIT
51, 111 TERMINAL POSITION INFORMATION ACQUISITION UNIT
60, 80, 90, 120 SERVER APPARATUS
61, 91, 121 TERMINAL INFORMATION ACQUISITION UNIT
62, 122 STORAGE UNIT
65, 71 CONTROL UNIT
100, 200, 300 INFORMATION PROCESSING SYSTEM
112 IMAGE PICKUP UNIT
113 DISPLAY UNIT

What is claimed is:

1. An information processing apparatus comprising:

at least one memory storing instructions, and at least one processor configured to execute the instructions to:

acquire terminal position information of a communication terminal;

hold a predetermined area and acoustic-image localization position information of an audio content to be output to the communication terminal while associating them with each other;

generate acoustic-image localization information based on the acoustic-image localization position information and the terminal position information when the terminal position information is included in the predetermined area;

output the acoustic-image localization information;

acquire direction information of the communication terminal; and adjust, when a distance between the terminal position information and position information of a target object becomes equal to a predetermined distance, and a direction indicated by the direction information is coincident with a target object direction indicating a direction of the target object with respect to the terminal position information, the acoustic-image localization position information so that the acoustic-image localization position information is not set in the target object direction.

2. The information processing apparatus according to claim 1, wherein the at least one processor is further configured to execute the instructions to adjust the acoustic-image localization position information according to a distance between the terminal position information and the acoustic-image localization position information.

3. The information processing apparatus according to claim 1, wherein when the communication terminal is moving away from a target object based on the terminal position information and position information of the target object, the at least one processor is further configured to execute the instructions to adjust the acoustic-image localization position information in a direction toward the target object with respect to the terminal position information.

4. The information processing apparatus according to claim 1, wherein the at least one processor is further configured to execute the instructions to adjust the acoustic-image localization position information at a timing at which the direction information changes and the direction indicated by the direction information becomes coincident with the target object direction.

5. The information processing apparatus according to claim 1, wherein the at least one processor is further configured to execute the instructions to adjust the acoustic-image localization position information at a timing at which the position information does not change for a predetermined time.

6. The information processing apparatus according to claim 1, wherein the terminal position information includes altitude information, and the at least one processor is further configured to execute the instructions to adjust the acoustic-image localization position information according to a change in the altitude information.

7. An information processing apparatus comprising:

at least one memory storing instructions, and at least one processor configured to execute the instructions to:

acquire terminal position information of a communication terminal;

hold a predetermined area and acoustic-image localization position information of an audio content to be output to the communication terminal while associating them with each other;

generate acoustic-image localization information based on the acoustic-image localization position information and the terminal position information when the terminal position information is included in the predetermined area;

output the acoustic-image localization information; and adjust the acoustic-image localization position information according to a length of the audio content.

8. An information processing apparatus comprising:

at least one memory storing instructions, and at least one processor configured to execute the instructions to:

acquire terminal position information of a communication terminal;

hold a predetermined area and acoustic-image localization position information of an audio content to be output to the communication terminal while associating them with each other;

generate acoustic-image localization information based on the acoustic-image localization position information and the terminal position information when the terminal position information is included in the predetermined area; and output the acoustic-image localization information, wherein the audio content includes an audio content related to a virtual object, and when the audio content related to the virtual object is output to the communication terminal, adjust the acoustic-image localization position information according to a degree of intimacy between a user possessing the communication terminal and the virtual object.

9. An information processing apparatus comprising:

at least one memory storing instructions, and at least one processor configured to execute the instructions to:

acquire terminal position information of a communication terminal;

hold a predetermined area and acoustic-image localization position information of an audio content to be output to the communication terminal while associating them with each other;

generate acoustic-image localization information based on the acoustic-image localization position information and the terminal position information when the terminal position information is included in the predetermined area;

output the acoustic-image localization information;

acquire a photograph image taken by the communication terminal;

when a position corresponding to the acoustic-image localization position information is included in the photograph image, generate display information related to the audio content; and output the display information to the communication terminal.

10. A control method comprising:

acquiring terminal position information of a communication terminal;

holding a predetermined area and acoustic-image localization position information of an audio content to be output to the communication terminal while associating them with each other;

generating acoustic-image localization information based on the acoustic-image localization position information and the terminal position information when the terminal position information is included in the predetermined area;

outputting the acoustic-image localization information;

acquiring direction information of the communication terminal; and adjusting, when a distance between the terminal position information and position information of a target object becomes equal to a predetermined distance, and a direction indicated by the direction information is coincident with a target object direction indicating a direction of the target object with respect to the terminal position information, the acoustic-image localization position information so that the acoustic-image localization position information is not set in the target object direction.

11. A non-transitory computer readable medium storing a control program for causing a computer to perform:

acquiring terminal position information of a communication terminal;

holding a predetermined area and acoustic-image localization position information of an audio content to be output to the communication terminal while associating them with each other;

generating acoustic-image localization information based on the acoustic-image localization position information and the terminal position information when the terminal position information is included in the predetermined area;

outputting the acoustic-image localization information;

acquiring direction information of the communication terminal; and adjusting, when a distance between the terminal position information and position information of a target object becomes equal to a predetermined distance, and a direction indicated by the direction information is coincident with a target object direction indicating a direction of the target object with respect to the terminal position information, the acoustic-image localization position information so that the acoustic-image localization position information is not set in the target object direction.

12. A control method comprising:

acquiring terminal position information of a communication terminal;

holding a predetermined area and acoustic-image localization position information of an audio content to be output to the communication terminal while associating them with each other;

generating acoustic-image localization information based on the acoustic-image localization position information and the terminal position information when the terminal position information is included in the predetermined area;

outputting the acoustic-image localization information; and adjusting the acoustic-image localization position information according to a length of the audio content.

13. A control method comprising:

acquiring terminal position information of a communication terminal;

holding a predetermined area and acoustic-image localization position information of an audio content to be output to the communication terminal while associating them with each other;

generating acoustic-image localization information based on the acoustic-image localization position information and the terminal position information when the terminal position information is included in the predetermined area; and outputting the acoustic-image localization information, wherein the audio content includes an audio content related to a virtual object, and when the audio content related to the virtual object is output to the communication terminal, adjusting the acoustic-image localization position information according to a degree of intimacy between a user possessing the communication terminal and the virtual object.

14. A control method comprising:

acquiring terminal position information of a communication terminal;

holding a predetermined area and acoustic-image localization position information of an audio content to be output to the communication terminal while associating them with each other;

generating acoustic-image localization information based on the acoustic-image localization position information and the terminal position information when the terminal position information is included in the predetermined area;

outputting the acoustic-image localization information;

acquiring a photograph image taken by the communication terminal;

when a position corresponding to the acoustic-image localization position information is included in the photograph image, generating display information related to the audio content; and outputting the display information to the communication terminal.

15. A non-transitory computer readable medium storing a control program for causing a computer to perform:

acquiring terminal position information of a communication terminal;

holding a predetermined area and acoustic-image localization position information of an audio content to be output to the communication terminal while associating them with each other;

generating acoustic-image localization information based on the acoustic-image localization position information and the terminal position information when the terminal position information is included in the predetermined area;

outputting the acoustic-image localization information; and adjusting the acoustic-image localization position information according to a length of the audio content.

16. A non-transitory computer readable medium storing a control program for causing a computer to perform:

acquiring terminal position information of a communication terminal;

holding a predetermined area and acoustic-image localization position information of an audio content to be output to the communication terminal while associating them with each other;

generating acoustic-image localization information based on the acoustic-image localization position information and the terminal position information when the terminal position information is included in the predetermined area; and outputting the acoustic-image localization information, wherein the audio content includes an audio content related to a virtual object, and when the audio content related to the virtual object is output to the communication terminal, adjusting the acoustic-image localization position information according to a degree of intimacy between a user possessing the communication terminal and the virtual object.

17. A non-transitory computer readable medium storing a control program for causing a computer to perform:

acquiring terminal position information of a communication terminal;

holding a predetermined area and acoustic-image localization position information of an audio content to be output to the communication terminal while associating them with each other;

generating acoustic-image localization information based on the acoustic-image localization position information and the terminal position information when the terminal position information is included in the predetermined area;

outputting the acoustic-image localization information;

acquiring a photograph image taken by the communication terminal;

when a position corresponding to the acoustic-image localization position information is included in the photograph image, generating display information related to the audio content; and outputting the display information to the communication terminal.

* * * * *